（12）United States Patent
Shah et al.

(10) Patent No.: US 10,186,209 B1
(45) Date of Patent: Jan. 22, 2019

(54) NIGHT TIME CONTROL OF BRIGHTNESS AND BLUE LIGHT EMISSION IN DEVICE DISPLAYS

(71) Applicant: Amazon Technologies, Inc., Seattle, WA (US)

(72) Inventors: Suchit Shreyas Shah, San Jose, CA (US); Joseph Patrick Jones, Seattle, WA (US); Timothy Daniel Leehane, San Jose, CA (US); Martin Steven Rauchwerk, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 340 days.

(21) Appl. No.: 14/955,926

(22) Filed: Dec. 1, 2015

Related U.S. Application Data

(60) Provisional application No. 62/252,995, filed on Nov. 9, 2015.

(51) Int. Cl.
*G06F 3/00* (2006.01)
*G09G 3/34* (2006.01)
(Continued)

(52) U.S. Cl.
CPC ....... *G09G 3/3413* (2013.01); *G02F 1/13318* (2013.01); *G02F 1/133514* (2013.01); *G06T 11/60* (2013.01); *G09G 3/2003* (2013.01); *G09G 3/3611* (2013.01); *G09G 2310/08* (2013.01); *G09G 2320/0233* (2013.01); *G09G 2320/066* (2013.01); *G09G 2320/0633* (2013.01); *G09G 2320/0666* (2013.01);
(Continued)

(58) Field of Classification Search
CPC .. G09G 3/3413; G09G 3/3426; G09G 3/3607; G09G 5/02; G09G 2300/0452; G09G 2310/0235; G09G 2320/0276; G09G 2320/0646; G09G 2330/021; G09G 2340/0407; G09G 2340/0457; G09G 2340/06; G09G 2360/16
See application file for complete search history.

(56) References Cited

U.S. PATENT DOCUMENTS 6,624,828 B1 * 9/2003 Dresevic ............... G06F 1/1607
345/594
6,762,741 B2 * 7/2004 Weindorf ................ G09G 3/20
345/102
(Continued)

*Primary Examiner* — Stacy Khoo
(74) *Attorney, Agent, or Firm* — Eversheds Sutherland (US) LLP

(57) ABSTRACT

A computing device executes a "night mode" for optimizing the device display's light emission for night-time use. The device stores a dimming filter and/or a color filter to achieve a desired brightness and color temperature of the display. The dimming filter is used to set a display backlight level and to "dim" the display data itself via alpha blending of the screen image with a grey mask. The computing device can blend the image with the grey mask in order to dim the display below system minimums. The color filter is alpha blended with each pixel in the image to reduce the luminance of blue light until the luminance is lower than that of another color of the emitted light. The proper dimming and color filters may be selected according to a desired screen brightness obtained from user input and/or from ambient light sensor data.

15 Claims, 12 Drawing Sheets

(51) Int. Cl.
*G02F 1/1335* (2006.01)
*G02F 1/133* (2006.01)
*G09G 3/20* (2006.01)
*G09G 3/36* (2006.01)
*G06T 11/60* (2006.01)

(52) U.S. Cl.
CPC . *G09G 2360/141* (2013.01); *G09G 2360/144* (2013.01); *G09G 2360/145* (2013.01)

(56) References Cited

U.S. PATENT DOCUMENTS

| | | | |
|---|---|---|---|
| 2007/0081720 A1* | 4/2007 | Ok | H04N 1/6027 382/162 |
| 2008/0111882 A1* | 5/2008 | Tsai | G09G 5/14 348/115 |
| 2008/0188182 A1* | 8/2008 | Macholz | H04B 1/082 455/66.1 |
| 2012/0019493 A1* | 1/2012 | Barnhoefer | H05B 33/0851 345/207 |
| 2015/0054843 A1* | 2/2015 | McDonald | G06T 15/04 345/582 |

* cited by examiner

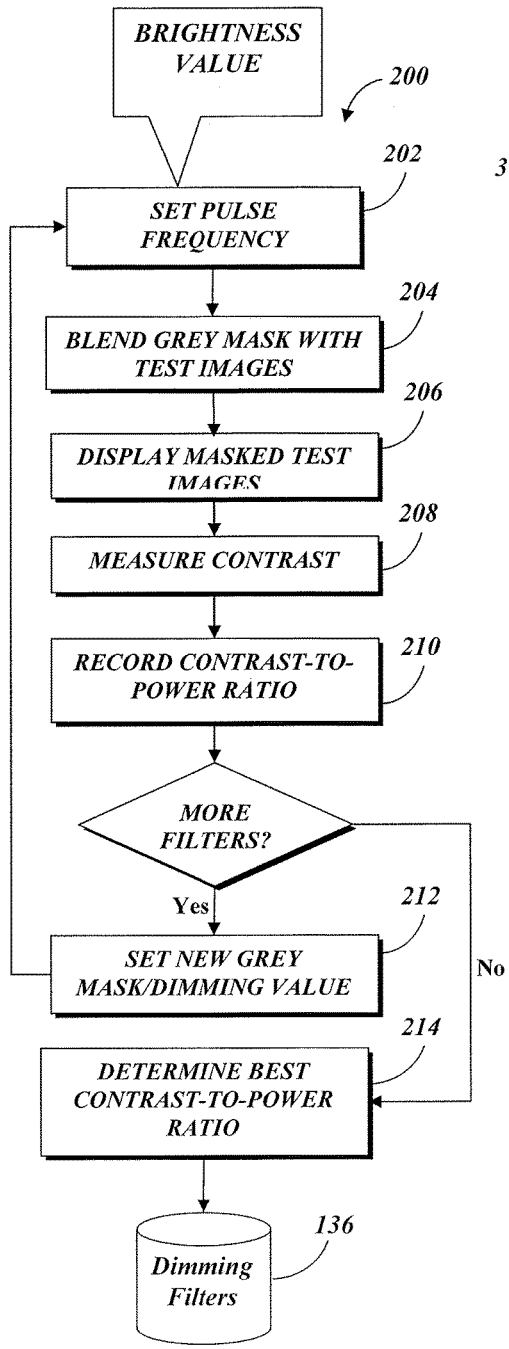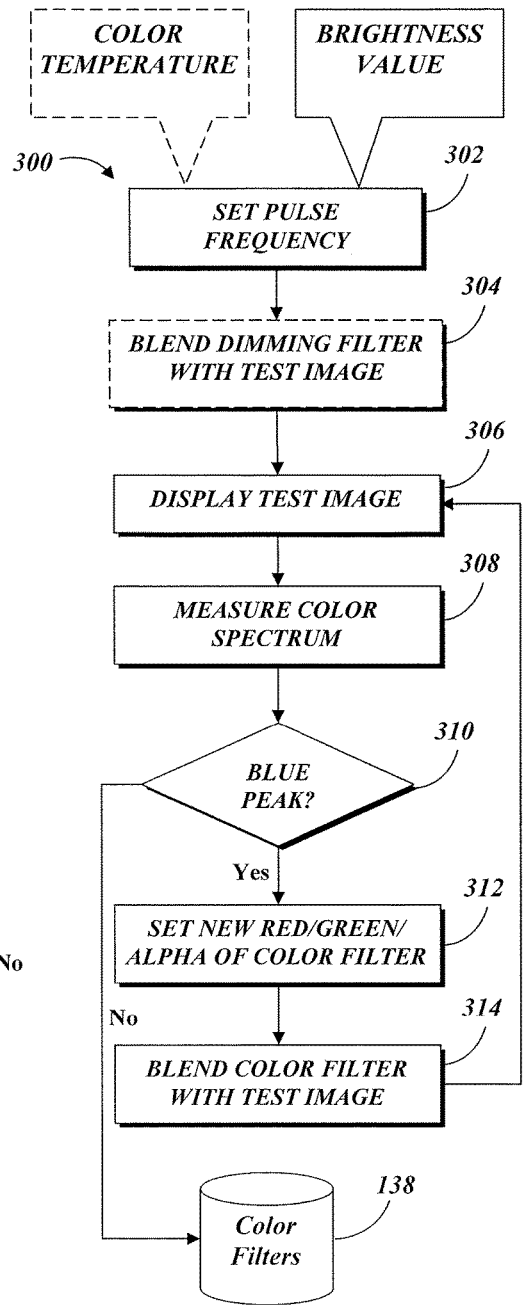
FIG. 2
FIG. 3

NIGHT TIME CONTROL OF BRIGHTNESS AND BLUE LIGHT EMISSION IN DEVICE DISPLAYS

BACKGROUND

Many computing devices include displays for displaying various types of images. Examples of such displays include cathode ray tubes (CRTs) liquid crystal displays (LCDs), electrophoretic displays (EPDs), light emitting diode displays (LED displays), and the like. Different types of displays have different components, configurations, and principles of operation for converting digital image data into the displayable image and displaying the image. An LCD, for example, uses the properties of liquid crystal molecules to control light passing through crossed polarizers. Several different mechanisms can add color to the light. Typically in computing devices, the LCD includes a layer of pixels arranged in a two-dimensional matrix. Each pixel is composed of three subpixels, one each allowing only red, green, or blue light to pass through. A layer of thin-film transistors (TFTs) controls the pixels, allowing a percentage of the incident light through each subpixel to generate the perceived colors of the pixels.

LCDs and some other types of displays do not generate light and must be illuminated by an optical system. Some optical systems include a light-emitting diode (LED) array, which converts an applied voltage into emitted light; an assembly of light guides and diffuser panels receives the light and creates a uniform luminance across the display. Such optical systems can be made substantially flat and used in flat-panel monitors and mobile devices. In particular, mobile devices may use an LED-backlit LCD in which the optical system emits light onto the back surface of the LCD, and the light passes through the LCD to produce the picture on the viewable surface. Light emission and power consumption is controlled by pulse-width modulation (PWM) of the voltage, i.e., switching the voltage on and off at a consistent pulse frequency. Reducing the pulse frequency (i.e., increasing the pulse width) reduces the power consumed by the LED array. Further, "dimming" the screen on such devices technically consists of reducing the pulse frequency, causing the LED array to emit less light and the luminance of the LCD, also referred to as the "brightness" of the picture, to decrease.

The pulse frequency for an LED array at full luminance is around 200 Hz, whereby the intermittent light appears to a viewer to be steadily on. Other PWM optical systems also use pulse frequencies over about 75 Hz, which is considered the human "flicker fusion threshold" at which intermittent stimulus appears steady. However, as the screen is dimmed, the pulse frequency can approach a rate at which the viewer might detect flicker. Computing devices avoid this with a system limit on the minimum pulse frequency or maximum pulse width; consequently, the screen can only be dimmed to the minimum system brightness imposed by the limit.

Biological research has shown that exposure to visible light in the blue wavelengths—from about 450 nm to about 490 nm (for reference, the RGB color model "blue" is at about 450 nm)—can negatively affect brain patterns such as the circadian rhythm, which in turn may disrupt or decrease the benefits of sleep. Unfortunately, computing device displays emit light that includes a significant blue component. LEDs, in particular, are manufactured in a manner that causes the color spectrum of the emitted light to inherently feature a blue wavelength luminance that is significantly higher than the luminance of any other color. Software applications are available that attempt to address the issue by changing the color temperature of the picture, wherein some selectable color temperatures suppress blue light. However, simply changing the color temperature can decrease contrast or readability of the picture. These negative effects can be exacerbated when the screen is also dimmed, as is typical for night-time use of the computing device. Depending on the device and implementation, other image processing may be needed to maintain picture quality.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

FIG. 2 is a flowchart illustrating an exemplary method of generating a dimming filter for use in night mode of a computing device, according to various embodiments.

FIG. 3 is a flowchart illustrating an exemplary method of generating a color filter for use in night mode of a computing device, according to various embodiments.

DETAILED DESCRIPTION

In various embodiments described herein, computing devices include displays for presenting content and other information. The described systems and methods improve the operation of such displays by implementing a "night mode" for the display, in which overall screen brightness may be reduced and adapted for ambient lighting conditions to alleviate eye strain, and in which the color spectrum of emitted light may be modified to reduce blue light luminance and/or to improve image quality in different types of ambient light. Night mode may configure the computing device to dim a viewing screen to a brightness that is below a system minimum brightness imposed by performance limitations of the computing device. Additionally or alternatively, night mode may suppress emission, from the viewing screen, of one or more wavelengths of blue light such that the peak luminance of blue light is reduced at least to a value that is below the peak luminance of at least one other color of light that is not blue.

According to embodiments described herein and other contemplated embodiments, one or both of the dimming and the blue suppression may be executed. The dimming may be performed before or after the blue suppression. In some embodiments, the dimming and the blue suppression may be performed simultaneously. The systems and methods may be implemented so that the image quality on the viewing screen, including contrast, readability, and realism, is not compromised. In some embodiments, night mode may balance the retention of image quality against the consumption of power by the device, by performing the dimming and/or the blue suppression using parameters that maximize a ratio of the viewing screen contrast compared to a power consumption level of the display.

Figure 1:
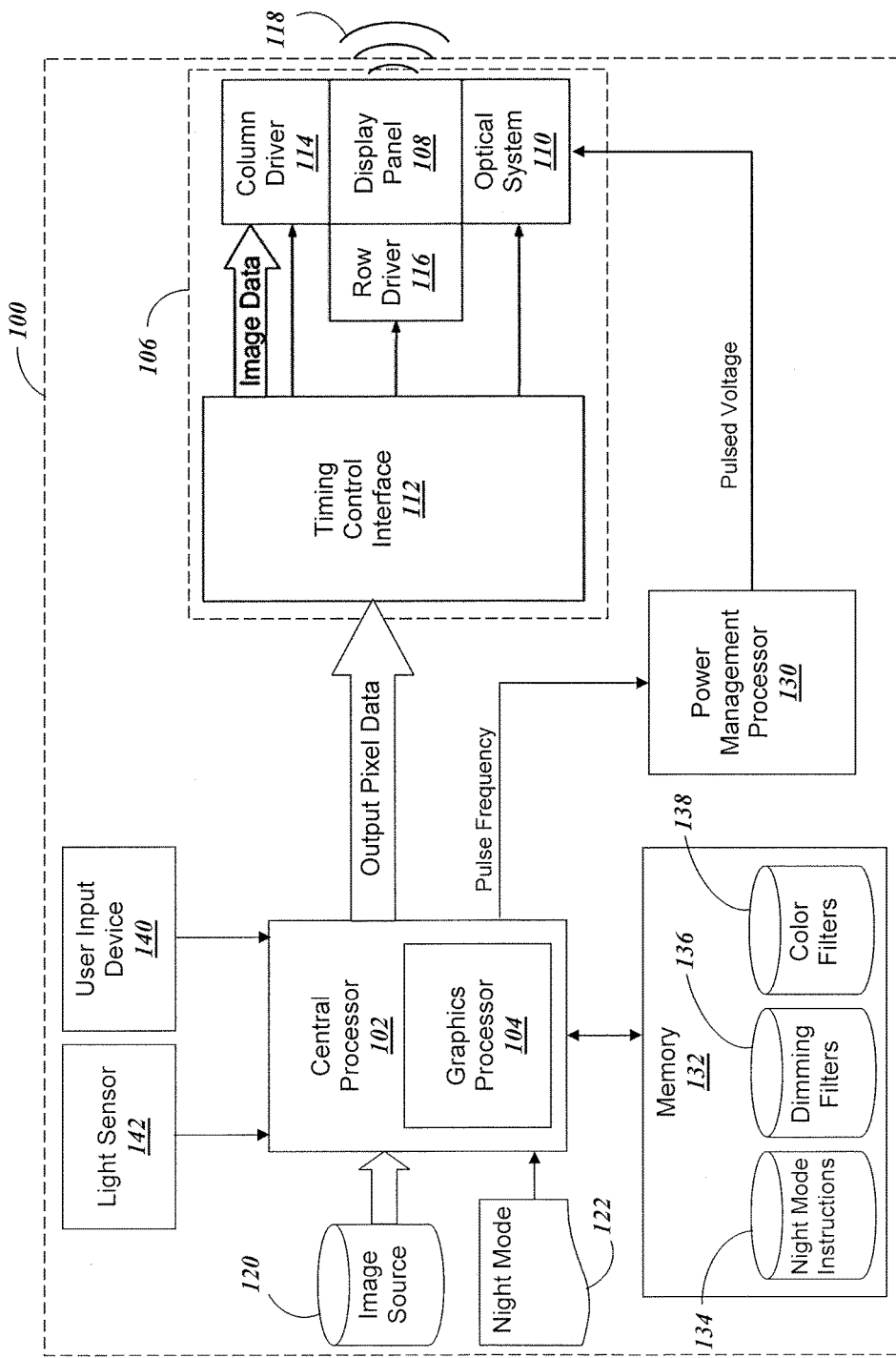
FIG. 1 is a schematic view of an exemplary computing device, according to various embodiments of the present systems and methods.

FIG. 1 diagrammatically illustrates an exemplary computing device 100 that implements night mode according to described embodiments. The computing device 100 may be a personal computer, a laptop, a tablet computer, a smartphone, or any similar computing device 100 having processing means and a display. A central processor 102 performs routine processing tasks such as executing programs, processing data, and the like, and can be specially configured to perform other operations by executing program instructions. Similarly, a graphics processor 104 may perform graphics processing tasks such as image and video processing, two- and three-dimensional graphics computation and generation, and the like. The graphics processor 104 may be on-board (i.e., integrated with) the central processor 102, or may be a separate component in electronic communication with the central processor 102. The central processor 102 or the graphics processor 104, or both, with or without other processors, may perform the unique image and other data processing described herein.

A display 106 may communicate with the processors 102, 104 and may receive image data to be presented to a viewer. The display 106 may be integrated into a single housing with the other components of the computing device 100, such as with a tablet computer, or the display 106 may be a separate component, such as with a desktop computer and monitor. The display 106 may be any type of display device and use any type of display technology suitable for the computing device 100; night mode does not require modifications to the display 106 hardware. Examples of such displays include CRTs, LCDs, EPDs, LED displays, and the like. Each of these examples further has subtypes that can be configured to implement night mode as described or with ascertainable modifications. LCDs, for example, can be passive or active matrix, thin-film transistor (TFT) LCDs, LED-backlit, cold cathode fluorescent lamp (CCFL)-backlit, bistable, and the like; active-matrix LCDs can further use different technologies such as nematic twisted liquid crystals, in-plane switching, fringe field switching, blue phase mode, etc. The most common type of display in mobile devices, such as tablet computers and smartphones, is a white LED-backlit LCD; the exemplary device 100 is illustrated and described with respect to a white LED-backlit LCD as the display 106, but this choice of exemplary display 106 is not limiting.

The display 106 includes a display panel 108, an optical system 110, a timing control interface 112, a column driver 114, and a row driver 116. In some examples, the computing device 100 or the display 106 may include one or more additional components associated with operation of the display 106, such as a touch sensor component layered atop the display panel 108 for detecting touch inputs, or a dedicated power supply for powering the display 106 components. The display panel 108 displays content (i.e., the processed images) to the viewer. The display panel 108 may be made up of rows and columns of picture elements ("pixels," referred to herein as display pixels to differentiate from the pixels of a digital image) that form a two-dimensional matrix of color-filtered apertures (RGB subpixels, in an LCD).

The display panel 108 in some displays 106 can self-illuminate, while others require light supplied by the optical system 110. The optical system 110 emits controlled light onto the display panel 108 to illuminate the display pixels. If the display panel 108 is implemented as an array of transmissive pixels, the optical system 110 may be implemented as a back light. In which case, when activated, the optical system 110 causes light to pass through the open pixels of the display panel 110 to a viewer. Conversely, if the display panel 108 is implemented as an array of reflective pixels, the optical system 110 may be implemented as a front light. In this case, when activated, the optical system 110 causes light to strike the viewing surface of the display panel 108 and be reflected back out of open pixels to a viewer. The amount of light that travels through the display pixels when the display pixels are all fully open (i.e., allowing white light to pass at full intensity) determines the luminance, or maximum "brightness," of the viewing screen (i.e., the front surface of the display panel 108) at the intensity level of the emitted light.

The optical system 110 may be implemented using any appropriate light generating devices, such as an LED or an array of LEDs. The optical system 110 may include a single light source disposed at one edge of the display panel 108, or, when implemented as a backlight, may include a number of different light sources distributed along the back edges or over a back surface of the display panel 108. Alternatively, the optical system 110 may include one or more light bulbs, such as one or more halogen light bulbs.

The optical system 110 may receive a voltage that drives its light emission at a corresponding intensity level, referred to herein as the backlight level. In one specific embodiment, for example, the optical system 110 is driven by a pulsed voltage. When the pulse is high, the optical system 110 switches on its light sources, and when the pulse is low, the optical system 110 switches them off. The switching, at sufficiently high frequency, generates a steady backlight level that is proportional to the frequency and corresponds to a particular brightness of the display panel 108. The optical system 110 consumes power at a power consumption level that is also proportional to the frequency and/or the pulse width, with less voltage being converted into light at lower frequencies/widths. The optical system 110 may be coupled to a power management processor 130 enabling the power management processor 130 to control an output of the optical system 110, specifically, the backlight level. The power management processor 130 may supply the pulsed voltage to the optical system 110, in which case the power management processor 130 receives a voltage from a power supply and sends the voltage at a pulse frequency or a pulse width to generate the pulsed voltage for the optical system 110. In another embodiment, the optical system 110 may receive the voltage directly from the power supply, and the power management processor 130 may send the pulse frequency to the optical system 110, which creates the pulsed voltage itself.

Generally, the power management processor 130 is configured to modify the output of the optical system 110 at a relatively high pulse frequency, such as between 75 Hz and 200 Hz, which the power management processor 130 may receive from the central processor 102. In particular, the power management processor 130 or the optical system 110 may store and impose a system-limited minimum pulse frequency on the pulsed voltage. The minimum pulse frequency may be set at a value that is higher enough to generate a steady backlight level and avoid a detectable flicker on the viewing screen, such as 75 Hz. As a result, the backlight level is also limited to, and cannot go below, a minimum backlight level associated with the minimum pulse frequency; it follows that the screen brightness also has a system-limited minimum brightness level. The minimum brightness level is typically linked in a user interface to the lowest setting on a brightness slider for selecting the brightness.

In addition to, or instead of, the power management processor 130, the optical system 110 may be controlled by the timing control interface 112 in the manner described above. The timing control interface 112 further controls the column driver 114 and the row driver 116 to apply electrical signals to the display pixels, setting the display pixels in the proper sequence to display a corresponding image. The timing control interface 112 controls the column driver 114 and the row driver 116 using one or more addressing schemes that are included in the timing control interface 112 as either software or firmware. To coordinate the optical system 110 with the column driver 114 and the row driver 116, the timing control interface 112 may adjust the output of the optical system 110 at a rate about equal to the address period of the device 100. The timing control interface 112 can adjust or change the output of the optical system 110 each time the timing control interface 112 may also change the driving voltage being supplied to the display pixels of the display panel 108.

When the display pixels are set by the column driver 114 and the row driver 116 to display an image, such as a test or calibration image, a screen brightness 118 for the backlight level may be determined (e.g., in candelas per square meter (cd/m$^2$), or nits) and associated with the backlight level (e.g., stored in memory 132). A calibration image may be, for example, a completely white image that covers the entire viewable screen. In that case, the brightness 118 associated with each backlight level would approximate the maximum brightness achievable at that backlight level.

In normal operation, whether or not the computing device 100 is in night mode, to display content to a viewer the central processor 102 obtains or receives an image, video, data stream, or other visual data from an image source 120. A video or data stream generally represents a sequence of pixel display values (referred to herein as pixels to differentiate from the display pixels of the display panel 108), grouped per line; a sequence of lines, grouped per frame (equivalent to a static image); and a sequence of frames defining a frame sequence. The pixel data for each pixel includes red, green, and blue saturation values, and may also include an opacity value known as an alpha channel. The processor(s) 102 process the pixel data and other image data to prepare the content for rendering to the display 106. The processing tasks may depend on the content, the settings of the display 106, other input values, operating modes, etc. The image processing tasks while in night mode are described now.

The central processor 102 may perform tasks and configure other device components for night mode by accessing memory 132, executing program instructions 134 stored in the memory 132, and retrieving one or more dimming filters 136 and/or one or more color filters 138 stored in the memory 132, as described below. The program instructions 134 enable the central processor 102 to identify the suitable filter(s) 136, 138 and apply them to transform the original images, which are not optimized for display at night or in the environment of the computing device 100, into output images that, when they are displayed on the display panel 108, cause the display panel 108 to emit light having properties that are adapted for the night period. The program instructions 134 further enable the central processor 102 to determine, from the suitable filter(s) 136, 138, the optimal setting for a backlight or other optical system 110 that illuminates the display panel 108. Using the optimal backlight level potentially reduces energy consumption of the computing device 100.

A dimming filter 136 and a color filter 138 may be applied separately or together to produce these desirable properties of the emitted light. One desirable property is a target brightness 118. The target brightness 118 may be represented in the filters 136, 138 by a screen brightness value, which can be, for example, a hex or decimal integer or floating point number indicating the brightness in cd/m$^2$, or in another suitable unit of measure, or in an arbitrary scale that is proportionate to the actual brightness. A dimming filter 136 includes parameters having values that are selected to generate an output image (or to modify the output image produced by a previously applied color filter 138, called the "intermediate image" or "peak-reduced image") and an optimal pulse frequency that together will cause the display panel 108 to emit light at the target brightness. Using the dimming filter 136, the target brightness can be reached even when it is less than a system-limited minimum brightness imposed by one or more components of the computing device 100; that is, the display panel 108 can be dimmed below a threshold that the optical system 110 cannot overcome on its own.

Another desirable property is high readability of the viewing screen, which is correlated to the contrast ratio of the display panel 108 at the target brightness. In some embodiments, the dimming filter 136 parameters may be set in order to achieve a maximum contrast ratio at the target brightness. In other embodiments, where low power consumption of the computing device 100 is desirable, the dimming filter 136 parameters may be set in order to maximize a ratio of the contrast to the power consumption level of the optical system 110. Other desirable properties of the emitted light and otherwise in the computing device 100 may be achieved by setting appropriate values of the dimming filter 136 parameters.

The dimming filter 136 parameters may include a dimming value and a grey mask. The dimming value is used by the central processor 102 to set the pulse frequency or pulse width of the pulsed voltage that drives the optical system 110. The dimming value may be generated and/or stored in any suitable format for indicating, to a controller of the optical system 110 (e.g., the power management processor 130 or timing control interface 112) the proper pulse frequency or pulse width. Suitable formats include but are not limited to a frequency (e.g., in Hz), a width (e.g., in sec), and a scalar that indicates a proportional reduction of the pulse frequency from the maximum or "full illumination" setting.

The grey mask may include color information against which the colors of pixels in the image are masked, as described below. The grey mask may store its color information in any suitable format. Non-limiting examples include a global or color-specific desaturation value or percentage, an RGB model or CMYK model scalar having a series of scalar values corresponding to each color in the color model (red, green, and blue; or cyan, magenta, yellow, and key (black)), or an RGB tuple stored with one or more alpha channel values representing opacity of the colors. The embodiments described herein use a grey mask storing a "black" RGB tuple (red, green, and blue saturations are all zero) and a global (i.e., single) alpha value indicating the opacity of the black tuple in a range extending from zero opacity, which is fully transparent, to full opacity, which is fully opaque. Exemplary representative number schemes for the opacity range include fractions from zero to one, whole hexadecimal numbers from 00 to FF (mimicking the range of color saturation values), decimal integers from 0 to 255 (also mimicking the color saturation range) or on another suitable scale, and the like.

A color filter 138 includes an RGB filter tuple and an alpha filter value having values that are selected to generate an output image, or to modify the intermediate image (or "dimmed" image) created from the dimming filter 136, such that when the display panel 108 displays the output image at the target brightness, the emitted light of the display panel 108 exhibits a color spectrum across the wavelengths of visible light, in which color spectrum the wavelengths of blue light have a luminance that is less luminous than that of at least one other color of light. This blue light suppression is a desired property for night period use of the computing device 100. Additionally, the parameters of the color filter 138 may be set to produce a target color temperature (measured in degrees Kelvin) in the emitted light. The color filter 138 may also contribute to the contrast ratio of the display panel 108 when applied to the images, and may operate in cooperation with the dimming filter 136 to optimize contrast/readability.

The RGB filter tuple comprises a red filter value representing red saturation in the color filter 138, a green filter value representing green saturation in the color filter 138, and a blue filter value representing blue saturation in the color filter 138. In some embodiments, the blue filter value may be set to zero to maximize blue light suppression; however, it may not be necessary to fully desaturate blue in the color filter 138, and low values of blue may produce a better picture quality without compromising the suppression of blue light. With blue saturation low or zero, the color filter 138 acts as a red (associated with candlelight in the color temperature spectrum) or yellow (associated with moonlight in the color temperature spectrum) filter, depending on the saturation of red and green and the color filter 138 opacity set by the alpha filter value. As shown in the exemplary lookup table below, at some screen brightness values for the target brightness it may be optimal to set the red filter value to a maximum saturation, including in color filters 138 having a blue filter value of zero. For such color filters 138, values for the green filter value and the alpha filter value around the middle of the saturation and opacity ranges, respectively, may generate color temperatures in the "moonlight" range when alpha blended with pure white as described below.

In some embodiments, such as in the computing device 100 of FIG. 1, a plurality of dimming filters 136 and a plurality of color filters 138 may be stored in memory 132. The memory 132 may be located on the computing device 100 or remotely therefrom, but accessible by the central processor 102 in any case. Additionally, the filters 136, 138 may be stored in other locations. The filters 136, 138 may be stored in any format, file or storage scheme. In one embodiment, the filters 136, 138 may each be a record in a database. In another embodiment, the memory 132 may store one or more lookup tables of the filters 136, 138, such as a first lookup table for the dimming filters 136 and a second lookup table for the color filters 138. In embodiments where each filter 136, 138 may simply be a line of delimited text or a row in a table, the lookup table scheme may provide speed advantages over other approaches, because the values for the filter 136, 138 parameters may be calculated in advance and the filters 136, 138 listed by filter identifier in ascending order in the lookup tables, which consume a very small amount of memory. In still other embodiments, the filters 136, 138 may be stored in one or more hash trees or other search-optimized data structures.

In some embodiments, the filter identifier may be a unique number or character string assigned to each filter 136, 138. In other embodiments, the filter identifier may be one or more of the filter parameters or characteristics. In particular, there may be only one dimming filter 136 and one color filter 138 configured to produce the target brightness represented by a certain screen brightness value; the screen brightness value may thus serve as the filter identifier. Another input value may additionally or alternatively be a filter identifier. For example, as described below the central processor 102 may receive a value representing an intensity of ambient light detected by a light sensor 142; this value may be associated with a target brightness, and thus with a screen brightness value. Each filter 136, 138 may include and be stored with any or all of its filter identifiers, or the filter 136, 138 may store a reference to the filter identifier, or may be indirectly identified by the filter identifier via an association of the filter identifier with another filter identifier stored in the filter 136, 138.

Table 1 demonstrates an exemplary lookup table for the dimming filters 136. In some embodiments, the lookup table may include a dimming filter 136 for every potential screen brightness value. In other embodiments, the dimming filters 136 may represent only a subset of the potential screen brightness values. The exemplary lookup table stores, for each dimming filter 136, the associated screen brightness value (which is the lookup value), the mask values in the grey mask, and the dimming value. The exemplary table also stores the contrast ratio that the dimming filter 136 achieves at its associated target brightness.

TABLE 1

| Subset of Dimming Filters | | | | | | |
|---|---|---|---|---|---|---|
| Measured Brightness | Alpha (0-255) | RED (0-255) | GREEN (0-255) | BLUE (0-255) | DIM (0-1) | CONTRAST |
| 18.03 | 0 | 0 | 0 | 0 | 0 | 902 |
| 15.31 | 0 | 0 | 0 | 0 | 0.1 | 766 |
| 14.74 | 30 | 0 | 0 | 0 | 0 | 737 |
| 13.09 | 45 | 0 | 0 | 0 | 0 | 655 |
| 12.43 | 0 | 0 | 0 | 0 | 0.2 | 621 |

TABLE 1-continued

Subset of Dimming Filters

| Measured Brightness | Alpha (0-255) | RED (0-255) | GREEN (0-255) | BLUE (0-255) | DIM (0-1) | CONTRAST |
|---|---|---|---|---|---|---|
| 11.36 | 60 | 0 | 0 | 0 | 0 | 568 |
| 9.80 | 30 | 0 | 0 | 0 | 0.2 | 490 |
| 8.26 | 90 | 0 | 0 | 0 | 0 | 413 |
| 7.47 | 30 | 0 | 0 | 0 | 0.3 | 374 |
| 6.28 | 75 | 0 | 0 | 0 | 0.2 | 314 |
| 5.45 | 120 | 0 | 0 | 0 | 0 | 273 |
| 4.33 | 120 | 0 | 0 | 0 | 0.1 | 216 |
| 3.49 | 120 | 0 | 0 | 0 | 0.2 | 174 |
| 2.64 | 120 | 0 | 0 | 0 | 0.3 | 132 |
| 1.75 | 60 | 0 | 0 | 0 | 0.6 | 88 |

Table 2 demonstrates an exemplary lookup table for the color filters 138. In some embodiments, the lookup table may include a color filter 138 for every potential screen brightness value and/or for every potential color temperature. In other embodiments, the color filters 138 may represent only a subset of the potential screen brightness values and/or potential color temperatures. The exemplary lookup table stores, for each color filter 138, the associated screen brightness value (which in the example is the lookup value), the values of the RGB filter tuple, and the alpha filter value. The lookup table may also store the color temperature generated by the color filter 138 at the target brightness. In some embodiments, the lookup table may include the dimming value of the dimming filter 136 corresponding to the screen brightness value. Table 2 may alternatively be considered to represent a lookup table for a combined night mode filter, described below.

TABLE 2

Subset of Color/Night Mode Filters

| Alpha RED GREEN BLUE DIM | Brightness | CCT (K) |
|---|---|---|
| 7E-FF-00-00-0 | 7.39 | 2643 |
| 7E-FF-04-00-0 | 7.50 | 2680 |
| 7E-FF-08-00-0 | 7.63 | 2723 |
| 7E-FF-0C-00-0 | 7.75 | 2766 |
| 7E-FF-10-00-0 | 7.85 | 2798 |
| 78-FF-00-00-0 | 7.81 | 2825 |
| 78-FF-04-00-0 | 7.89 | 2857 |
| 78-FF-08-00-0 | 8.03 | 2904 |
| 78-FF-0C-00-0 | 8.12 | 2936 |
| 78-FF-10-00-0 | 8.26 | 2980 |
| 78-FF-14-00-0 | 8.31 | 2992 |
| 78-FF-18-00-0 | 8.44 | 3035 |
| 78-FF-1C-00-0 | 8.58 | 3074 |
| 78-FF-20-00-0 | 8.68 | 3106 |
| 78-FF-24-00-0 | 8.80 | 3143 |
| 78-FF-28-00-0 | 8.91 | 3175 |
| 78-FF-2C-00-0 | 9.02 | 3202 |
| 78-FF-30-00-0 | 9.17 | 3242 |
| 78-FF-34-00-0 | 9.20 | 3254 |
| 78-FF-38-00-0 | 9.35 | 3290 |
| 78-FF-3C-00-0 | 9.48 | 3327 |
| 78-FF-40-00-0 | 9.60 | 3360 |
| 78-FF-44-00-0 | 9.74 | 3395 |
| 78-FF-48-00-0 | 9.88 | 3428 |
| 78-FF-4C-00-0 | 10.05 | 3464 |
| 78-FF-50-00-0 | 10.18 | 3496 |
| 78-FF-54-00-0 | 10.30 | 3525 |
| 78-FF-58-00-0 | 10.41 | 3545 |
| 78-FF-5C-00-0 | 10.53 | 3570 |
| 78-FF-60-00-0 | 10.64 | 3597 |
| 78-FF-64-00-0 | 10.77 | 3626 |
| 78-FF-68-00-0 | 10.96 | 3657 |
| 78-FF-6C-00-0 | 11.07 | 3681 |
| 78-FF-70-00-0 | 11.20 | 3710 |

TABLE 2-continued

Subset of Color/Night Mode Filters

| Alpha RED GREEN BLUE DIM | Brightness | CCT (K) |
|---|---|---|
| 78-FF-74-00-0 | 11.34 | 3732 |
| 78-FF-78-00-0 | 11.41 | 3746 |
| 78-FF-7C-00-0 | 11.53 | 3769 |
| 00-00-00-00-0 | 18.01 | 6381 |

To be stored in a lookup table or other permanent storage, the values for the parameters of the filters 136, 138 must be obtained in advance of the computing device 100 entering night mode. The values may be obtained via a characterization process of the computing device 100, in which all or a representative subset of the possible combinations of values are tested and the resulting characteristics of the emitted light compared to identify and store the optimal set of values for each screen brightness value. This pre-processing saves computational overhead at runtime; a binary search or, worst case, a linear search of the stored filters 136, 138 is many times faster than determining the optimal filter values in real time absent a characteristic function. Additionally, characterizing the computing device 100, such as described below, provides the most accurate representation of the colors, luminance, and other processing and display attributes of the display 106; the filters 136, 138 in turn provide the most reliable results. In other embodiments, the filter 136, 138 values may be obtained by characterizing a representative device (which may be the computing device 100) and then used in the night modes of similar devices (e.g., all devices of the same make and model, which may include the computing device 100).

FIG. 2 illustrates an exemplary method 200 for calculating and storing the values for the dimming filters 136. For each desired screen brightness value, at step 202 a processor (e.g., central processor 102 or another processor of the computing device 100) sets the pulse frequency to an initial frequency of all of the potential pulse frequencies, the initial frequency corresponding to a first dimming value. Since all or a representative subset of the potential frequencies and dimming values will be tested, the value of the initial frequency is irrelevant. Similarly, any initial selection of the alpha mask value for the grey mask may be suitable, as all or a representative subset of the alpha mask values will be tested at each dimming value. At step 204, the processor combines the grey mask with one or more test images to produce one or more masked test images. Any suitable computer graphic composition technique may be used to mask the test images; the described embodiments employ an alpha blending technique described below, and the filter parameters and values therefor are selected for use in alpha blending, but such description is not intended to be limiting. In one embodiment, two test images are used: first the grey mask is combined with an all-white test image that would fill the viewing screen with white pixels, producing a masked white image; then, the grey mask is combined with an all-black test image that would fill the viewing screen with black pixels, producing a masked black image.

At step 206, the processor may render the masked test images to the display (e.g., display 106 of FIG. 1). At step 208, the contrast ratio of the display is measured as the masked test image is displayed. In one embodiment, the masked white image is displayed during a first measurement of the luminance of the screen, then the masked black image is displayed during a second measurement of the luminance of the screen; the contrast radio is calculated by dividing the first measurement of the luminance by the second measurement of the luminance. At step 210, the contrast-to-power ratio of the computing device using the current values for the dimming value and the grey mask is recorded. Then, at step 212, a new alpha mask value for the grey mask is selected and steps 202-210 may be repeated for the new value. The process (steps 202-212) repeats for each potential alpha mask value with the dimming value, and then a new dimming value is selected and the process (steps 202-212) is repeated. Once all combinations of dimming value and grey mask have been characterized, at step 214 the dimming filter 136 values that produce the highest contrast-to-power ratio for the screen brightness value are stored.

Figure 4:
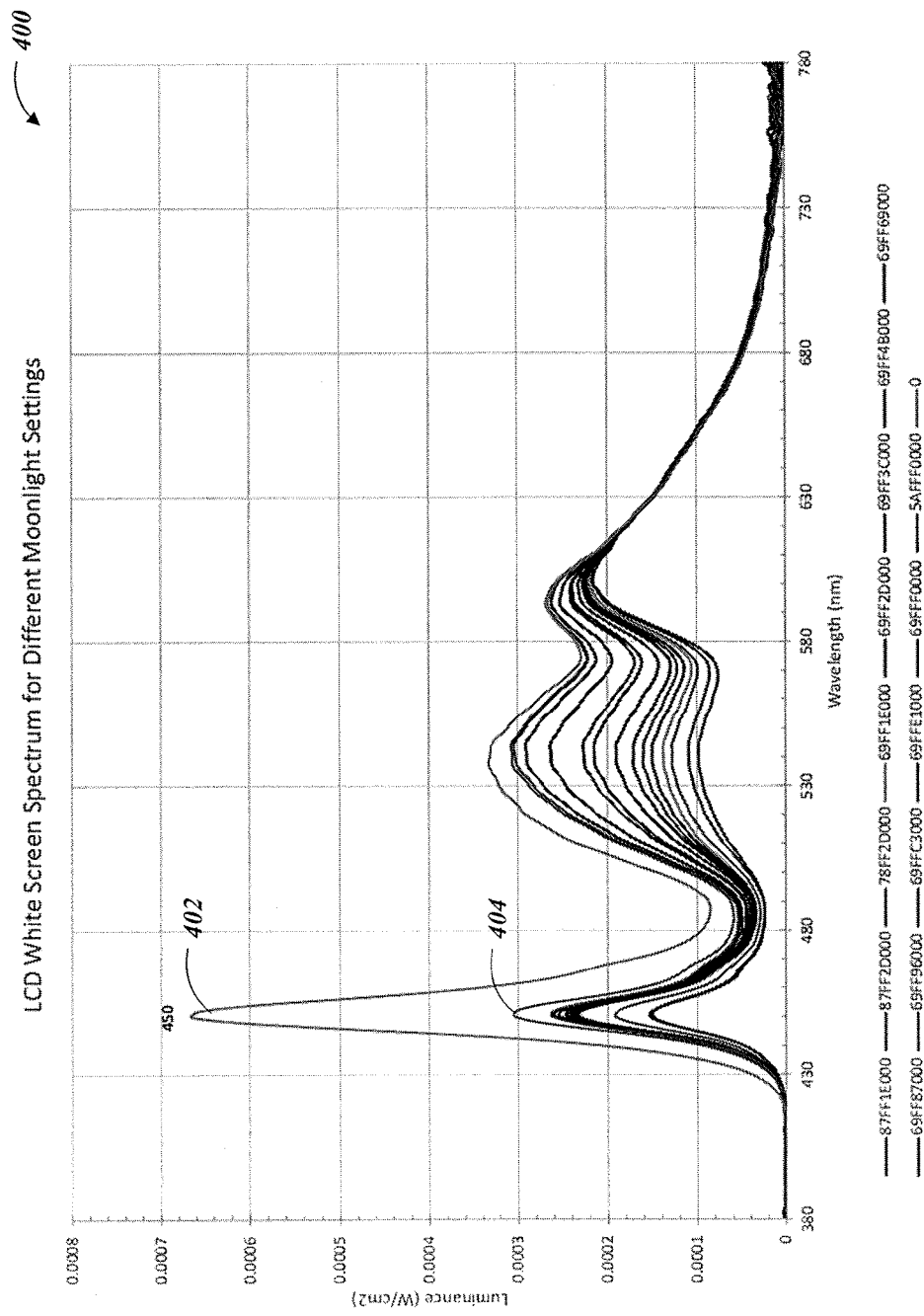
FIG. 4 is a graph comparing measured color spectra of a plurality of applied color filters.

FIG. 3 illustrates an exemplary method 300 for calculating and storing the values for the color filters 138. For each desired screen brightness value (and/or color temperature), at step 302 a processor (e.g., central processor 102 or another processor of the computing device 100) sets the pulse frequency, and at step 304 the processor combines, using alpha blending or another suitable technique, a test image with a dimming filter 136 associated with the screen brightness value, if one exists. Steps 302 and 304 together calibrate the display to display the test image at the target brightness, at step 306. The test image may be an all-white image. At step 308, the color spectrum of the emitted light from the display is measured, and at step 310 the color spectrum is analyzed to determine whether the wavelengths representing blue light have the highest luminance. If so, at step 312 new values are selected for one or more of the filter values in the color filter 138, and at step 314 the color filter 138 is combined, using alpha blending or another suitable technique, with the test image produced after step 304. The steps 306-314 are then repeated until a set of values for the color filter 138 reduce the blue light luminance to below the luminance of at least one other color of light, at which point the color filter 138 is stored. In FIG. 4, the graph 400 compares the color spectrum (i.e., wavelength on the x-axis and luminance on the y-axis) of an unfiltered display 402 of the white test image with the color spectra of a plurality of filtered displays (e.g., filtered display 404) that each have the blue (around 450 nm) luminance suppressed to a value below at least one other light color (usually green, around 540 nm). The color filter values are listed in the legend as two-digit hexadecimal values (alpha-red-green-blue).

While pre-calculating and storing the filter 136, 138 values can reduce runtime overhead, performing such a detailed characterization of the computing device 100 may not always be possible. In other embodiments, the values of the filters 136, 138 that correspond to the screen brightness value may be calculated using one or more derived formulas. The formulas may be used to pre-calculate and store the filter 136, 138 values as described above, but the values are likely to fit a more generalized domain of potential values and may not be as accurate as values that are calculated from direct measurements. Additionally or alternatively, the formulas may be used to calculate the filter 136, 138 values in real time, and the filters 136, 138 may be applied immediately to images in the display pipeline. After application, the filters 136, 138 may be discarded or may be saved for reuse.

Figure 5:
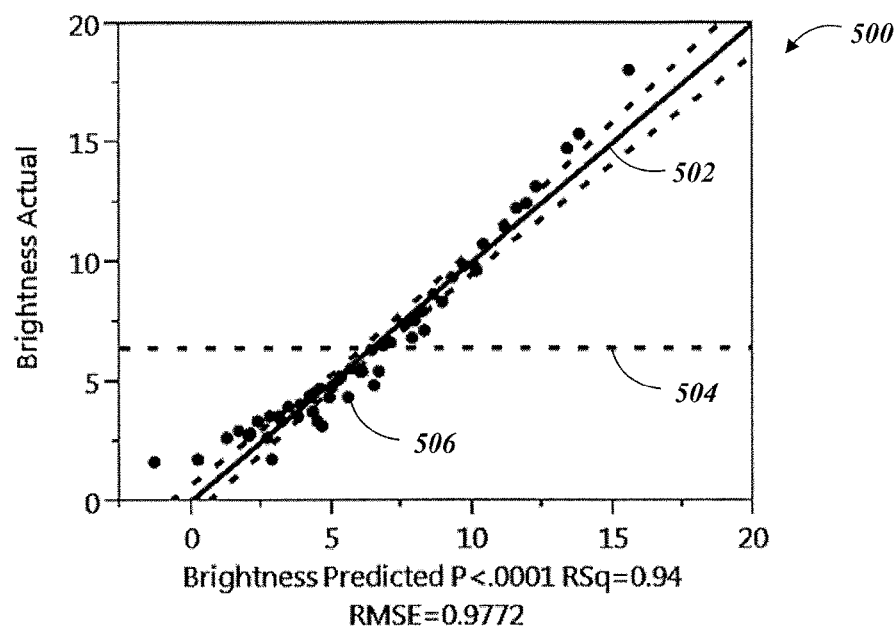
FIG. 5 is a graph comparing actual brightness of a computing device in night mode, to predicted brightness obtained by applying a linear function to generate the dimming filter values.

A characteristic function may be particularly effective at interpolating dimming filter 136 values because the brightness 118 of a display panel 108, particularly a LED-backlit LCD, tends to vary linearly with the emitted light of the optical system 110, which in turn varies linearly with the pulse frequency and/or pulse width of the pulsed voltage. In FIG. 5, the graph 500 demonstrates a linear fit 502 of data points 506 associating an actual measured brightness of the computing device 100 with a predicted brightness obtained from a linear function operating on either or both of the pulse frequency and the grey mask. At a system-limited minimum brightness 504, the optical system 110 cannot drive the backlight level any lower, and the continued linear reduction of the display brightness below the minimum brightness 504 is due solely to increasing the alpha mask value of the dimming filter 136, blending more and more black into the pixels of the image.

Referring again to FIG. 1, the central processor 102 may determine whether a night mode indicator 122 indicates that night mode is active for the device. The central processor 102 may automatically set the indicator 122, such as at a particular time of day, or an input may set the indicator 122 with or without processing of the input by the central processor 102. In one example, the central processor 102 may receive a user input, such as a button press on a "night mode" user interface element, from a user input device 140 in communication with the central processor 102. In another example, the central processor 102 may receive light sensor data from a light sensor 142 of the computing device 100, and may process the light sensor data to determine that the sun has gone down and the moon has come up, or that the computing device 100 has entered an environment lit by ambient light.

Figure 6:
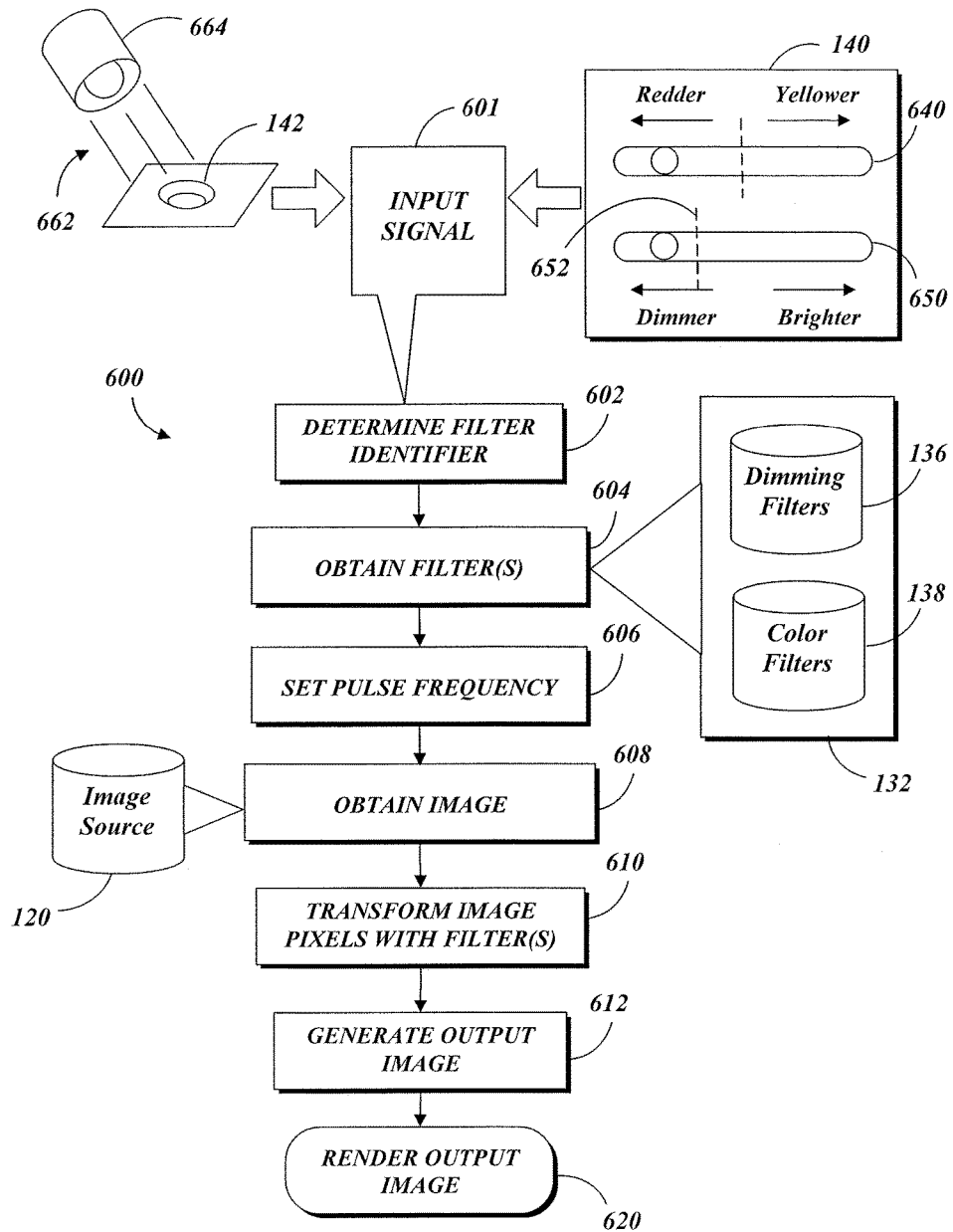
FIG. 6 is a flowchart illustrating an exemplary method of transforming a digital image for display, according to various embodiments.

If night mode is active, the central processor 102 may begin to transform images in the display pipeline. In one implementation, the central processor 102 may transform the images continuously once the computing device 100 enters night mode. In other implementations, such as in the method 600 of FIG. 6, the central processor 102 receives an input signal 601 and, at step 602, determines that the input signal 601 includes data identifying a night mode filter to be used to transform images to be displayed. Such an input signal 601 may further include an instruction to enter night mode, which the central processor 102 may execute as described above.

In some embodiments, the input signal 601 may be received from the user input device 140 and may thus comprise a user input. The user input may be a user selection or a user preference setting that contains a filter identifier. In one example, the user may select a desired brightness in a user interface, such as by manipulating a brightness slider 650. In cooperation with the enhanced brightness control of the computing device 100 in night mode, the brightness slider 650 may include selectable positions for one or more brightnesses that are below the system-limited minimum brightness represented by position 652. The user input device 140 or the central processor 102 may identify the position of the brightness slider 650, such as by receiving and processing the coordinates of a gesture on a touchscreen, and then convert the position or other format of selecting the desired brightness into a screen brightness value that is included in the input signal 601. Additionally or alternatively, the user may select a desired color temperature or color filter setting in the user interface, such as by manipulating a color slider 640. As described for the brightness slider 650, the user input device 140 or the central processor 102 may associate the position of the color slider 640 with a corresponding filter identifier, such as a color temperature, and include the filter identifier in the input signal 601. In some embodiments, every selectable position on the color slider 640 sends a color temperature to the central processor 102 that invokes the method 600 and produces a blue-suppressed (i.e., blue light luminance lower than at least one other luminance) color spectrum in the light emitted by the display panel 108.

In some embodiments, the input signal 601 may additionally or alternatively be received from the light sensor 142. The light sensor 142 may be an ambient light sensor that detects ambient light 662 produced by a light source 664 and incident on the light sensor 142. The ambient light sensor may measure the intensity and/or other characteristics of the ambient light 662, or may simply indicate that ambient light 662 is present. In an embodiment where the light sensor 142 measures an intensity of the incident light 662, the light sensor 142 may digitize the measured intensity into an ambient light value and transmit the ambient light value as part of the input signal 601.

At step 602 the central processor 102 may determine that the input signal 601 contains one or more filter identifiers. Filter identifiers may be any value stored (e.g., in the lookup table(s)) in one of the filters 136, 138 and being unique to one dimming filter 136 and/or one color filter 138, as described above. Where the method 600 uses the ambient light value to execute night mode, one or both of the dimming filters 136 and the color filters 138 may store an associated ambient light value. At step 604, the central processor 102 obtains the filter(s) 136, 138 identified by the filter identifier(s) from the memory 132 or other storage location. At step 606, the central processor 102 sets the pulse frequency/pulse width of the pulsed voltage delivered to the optical system 110. This, in turn, modulates light emission by the optical System 110 to a backlight level and modulates a power consumption level of the LED array or other lighting component in the optical system 110. The pulse frequency/pulse width may be determined from or associated with the dimming value of the identified dimming filter 136, if any. Alternatively, the pulse frequency/pulse width may be set to a default value; which may be a minimum frequency or a maximum frequency or another frequency.

At step 608, the central processor 102 may obtain the image to be transformed, such as from the image source 120. At step 610, the central processor 102 may transform the image, such as by applying the identified filter(s) 136, 138 to all, some, or one of the pixels of the image to produce output pixels having filtered RGB saturation values. Suitable transformation methods are discussed throughout this disclosure, and include in particular the alpha blending of the image pixels with the filter(s) 136, 138 as described below. At step 612, the central processor 102 may generate an output image comprising the output pixels. Effectively, the output image comprises the original image modified (i.e., color-filtered and/or dimmed) so that when the display panel 108 displays the output image and is backlit at the backlight level set in step 606, the light emitted by the display panel 108 exhibits one or more properties desirable for night viewing, including (1) a blue-suppressed color spectrum, (2) a brightness 118 approximately equal to the target brightness associated with the screen brightness value, and (3) a contrast-to-power ratio that is maximized for the brightness 118. At step 620, the central processor 102 may render the output image to the display 106 as described above.

Figure 7:
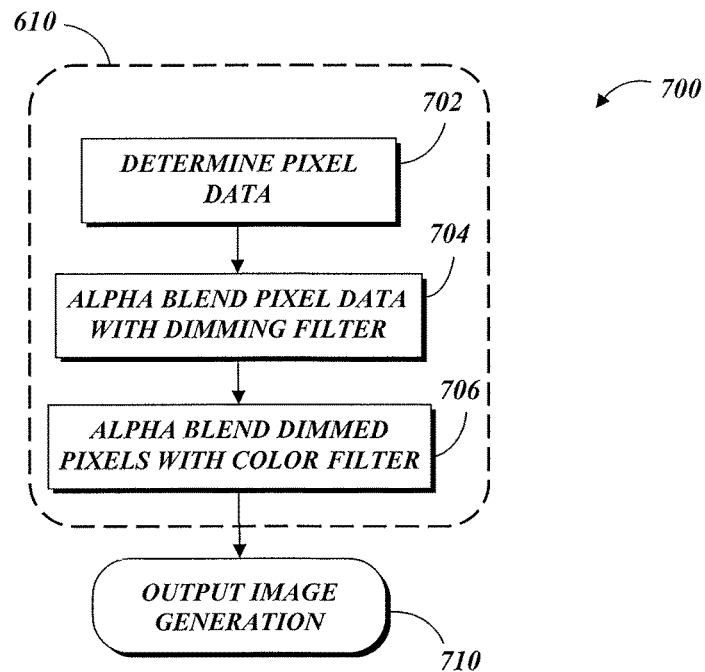
FIG. 7 is a flowchart illustrating another exemplary method of transforming a digital image for display, according to various embodiments.

Referring to FIG. 7, an exemplary method 700 for transforming the image data (e.g., pixels of the image, as in step 610 of FIG. 6) is based on the technique of "alpha" blending, in which a first color and a second color overlaying the first color are blended together to make a third color according to the opacities of the first and second colors. The second/foreground color has some degree of transparency, and in some cases the first/background color also is at least partially transparent (i.e., translucent). Pixels using the RGB color model can be configured for alpha blending by adding an opacity, or alpha channel, to the pixel. The alpha channel may have a single alpha value, to be applied "globally" to all three color values in the pixel to set the color opacity. Alternatively, the alpha channel may have an alpha value for each color value, and the alpha values may be different from each other.

In the present method 700, the central processor 102 may at step 702 determine the pixel data for the pixel(s) in the image that are going to be transformed. In some embodiments, this involves simply reading the red, green, and blue values of each pixel from the image data. The pixels of the image may not have an alpha channel, or may have an alpha value indicating the pixels are fully opaque (i.e., 1.0 on a scale of 0.0 to 1.0), if the image has already been composited or otherwise prepared by the graphics processor 104 (or another processor) to be rendered to the display 106. Alternatively, one or more of the pixels may have a non-opaque alpha value (i.e., between 0.0 and 1.0). Each identified filter 136, 138 (e.g., those obtained at step 604) includes an alpha value that sets the opacity of the color values of the filter 136, 138. In particular, the grey mask of the dimming filter 136 includes an alpha mask value that, essentially, performs the dimness filtering by turning the black tuple of the grey mask partially transparent and, therefore, grey. Similarly, the color filter 138 has an alpha filter value that sets the opacity of the red filter value, the green filter value, and the blue filter value. In one embodiment, each of the RGB values of the filters 136, 138 may be pre-multiplied by the corresponding alpha value when the RGB values are stored in the filter 136, 138.

At step 704, the central processor 102 may perform a first alpha blending of the pixel data with the dimming filter 136. In this alpha blending, the color of each pixel being blended is the "background" color, and the black tuple of the grey mask is the "foreground" color. The respective alpha channels of the pixel and the grey mask are incorporated into the alpha blending, which may involve any suitable alpha blending or alpha compositing algorithm or a combination of algorithms. In one embodiment, if the pixel is opaque (i.e., has no alpha channel or an alpha value of 1.0), the dimmed output pixel will also be opaque and will have a color given by:

$$out_{RGB} = (fore_{RGB})(fore_A)(back_{RGB})(1-fore_A)$$

and if the pixel has an alpha value less than 1.0, the dimmed output pixel will have RGB and alpha values given by:

$$out_A = fore_A + back_A(1 - fore_A);$$

$$out_{RGB} = ((fore_{RGB})(fore_A) + (back_{RGB})(back_A)(1 - fore_A)) + out_A.$$

At step 706, the central processor 102 may perform a second alpha blending of the dimmed output pixel data with the color filter 138. In this alpha blending, the color of each dimmed pixel being blended is the "background" color, and the color of the RGB filter tuple (i.e., the red filter value, green filter value, and blue filter value) is the "foreground" color. The respective alpha channels of the dimmed pixel and the RGB filter tuple (i.e., the alpha filter value) are incorporated into the alpha blending, which may involve any suitable alpha blending or alpha compositing algorithm or a combination of algorithms. In one embodiment, the alpha blending provided above with respect to step 704 is performed to generate output pixel data comprising RGB, and in some cases alpha, values of the output pixels that have been dimmed and blue-suppressed. At step 710, the central processor 102 generates the output image from the output pixel, as described above with respect to step 612 of FIG. 6.

Figure 8:
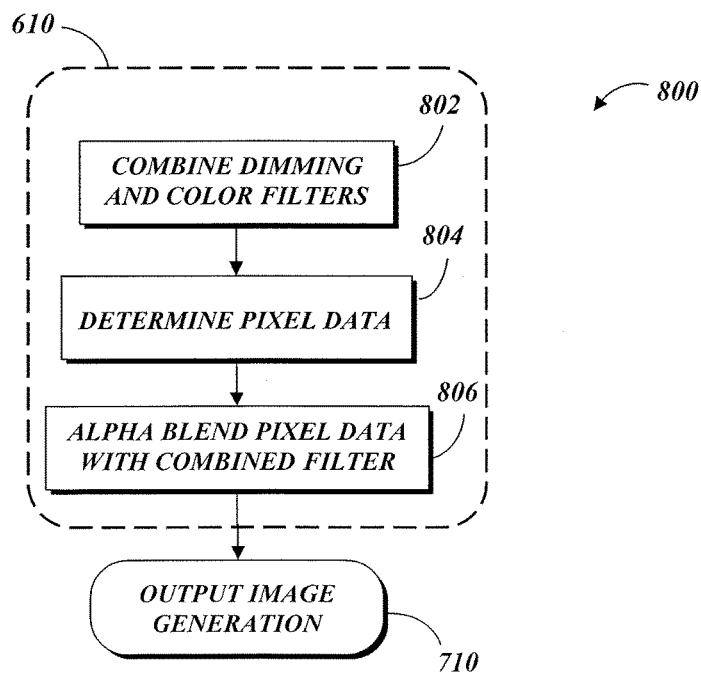
FIG. 8 is a flowchart illustrating an exemplary method of implementing night mode on a computing device, according to various embodiments.

In other embodiments, the alpha blending order of the filters 136, 138 may be reversed, with the color filter 138 being applied first. In still other embodiments, only the dimming filter 136 or only the color filter 138 may be applied. FIG. 8 illustrates yet another embodiment of a method 800 for transforming the image data (e.g., pixels of the image, as in step 610 of FIG. 6). At step 802, the central processor 102 may combine the dimming filter 136 and the color filter 138 to produce a single, combined night mode filter. In one embodiment, the grey mask and the RGB filter tuple+alpha filter value may be alpha blended together to produce a combined RGB filter tuple and a combined alpha filter value. Either color may be the background color, and the other color may be the foreground color. The alpha blending described above or another suitable alpha blending algorithm may be applied. Other parameters of one of the filters 136, 138, such as the dimming value (see Table 2) and/or the color temperature, may be included in the combined night mode filter.

At step 804, the central processor 102 may determine the pixel data of the image, as described above with respect to step 702 of FIG. 7. At step 806, the central processor 102 may perform an alpha blending of the pixel data with the combined night mode filter. In this alpha blending, the color of each pixel being blended is the "background" color, and the color of the tuple in the combined night mode filter is the "foreground" color. The respective alpha channels of the pixel and the combined filter are incorporated into the alpha blending, which may involve any suitable alpha blending or alpha compositing algorithm or a combination of algorithms. In one embodiment, the alpha blending provided above with respect to step 704 is performed to generate output pixel data comprising RGB, and in some cases alpha, values of the output pixels that have been dimmed and blue-suppressed by the combined filter. At step 710, the central processor 102 generates the output image from the output pixel, as described above with respect to step 612 of FIG. 6.

Figure 9:
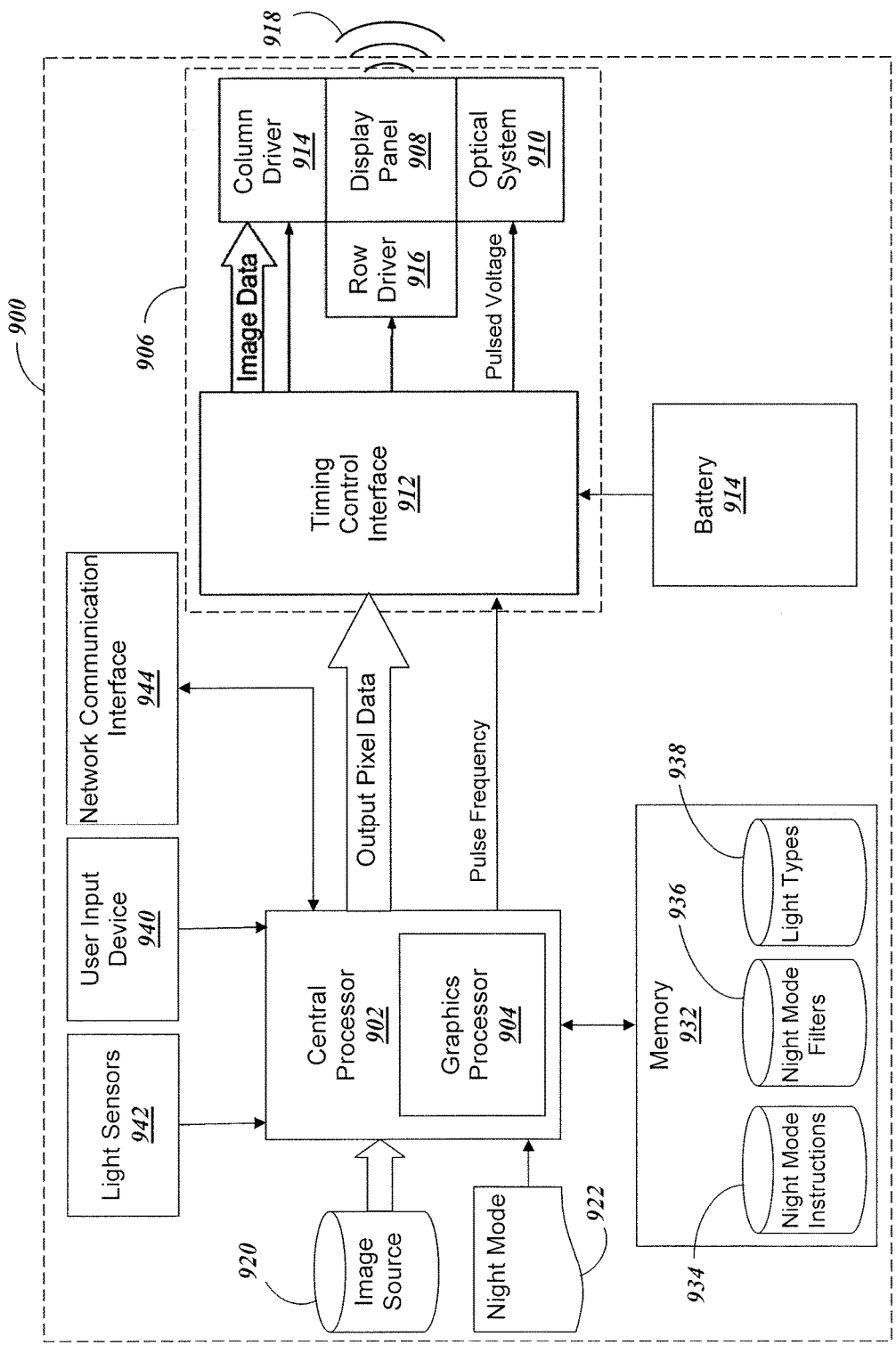
FIG. 9 is a schematic view of another exemplary computing device, according to various embodiments of the present systems and methods.

FIG. 9 depicts a computing device 900 that is a variation of the computing device 100 of FIG. 1. A central processor 902 and/or graphics processor 904 operate similarly to the central processor 102 of FIG. 1. However, rather than sending the pulse frequency to the power management processor 130, the central processor 902 sends it to a timing control interface 912. The timing control interface 912 receives its voltage from a power supply, such as a battery 914, and delivers the voltage to an optical system 910 at a pulse frequency. The optical system 910 and the other components of the display 906—the display panel 908 (generating the brightness 918), the row driver 916, and the column driver 914—function in approximately the same way as their counterparts from FIG. 1. The image source 920, night mode indicator 922, and user device 940 are also the same as their counterparts of FIG. 1.

The memory 932 stores night mode instructions 934, night mode filters 936, and light types 938. Each of these types of data may be stored in the same or a different database, or in another data format, in the memory 932. The central processor 102 may execute the night mode instructions 934 as described above with respect to the night mode instructions 134 of FIG. 1. The night mode filters 936 and light types 938 may alternatively be stored as lookup tables in the manner described above with respect to the dimming filters 136 and color filters 138 of FIG. 1. While the method 800 of FIG. 8 entails combining the identified dimming filter (e.g., dimming filter 136) with the identified color filter (e.g., color filter 138) in real time before applying the combined filter to the image, the system 900 provides for pre-processing the combination of the two filters into a single night mode filter 936, which is then stored in memory 932 and retrieved by the central processor 902 for use during night mode. Thus, the method 800 of FIG. 8 is an exemplary method of producing the night mode filters 936, though other methods of combining a dimming filter with a color filter to produce a single combined night mode filter that configures the device 900 to exhibit the light emission, picture quality, and power management properties of the separate filters.

The computing device 900 may include one or more light sensors 942. One or more of the light sensors 942 may be an ambient light sensor as described above with respect to the light sensor 142 of FIG. 1. Additionally or alternatively, one or more of the light sensors 942 may be a digital light converter (DLC, also known as a "light-to-digital converter") that detects incident ambient and/or directed light and generates a digital profile of the light. The digital profile includes a light color, which may be described in RGB or another color model, and may further include values for other characteristics such as intensity and incident angle. In one embodiment, the DLC generates an RGB light tuple comprising a red light value, a green light value, and a blue light value that together represent the detected color of the detected light. The DLC may send the RGB light tuple and other parameters of the digital profile, if any, to the central processor 902.

The computing device 900 may include a network communication interface 944 for connecting the device 900 with one or more communication networks, and with one or more devices connected to the communication network(s). The network may be the internet or another wide-area network, an Ethernet or other local-area network, a direct communication network with another device (e.g., as a Bluetooth interface), or another suitable electronic communication network. In one implementation, the device 900 may communicate with one or more smart devices, such as a network-configurable thermostat, a network-configurable light controller, or a home management hub such as the AMAZON ECHO. The computing device 900 may be enabled to configure operating parameters of the smart device (i.e., connected to a network and authorized to access the smart device). In such an implementation, the central processor 902 executing the night mode program instructions 934 may be further configured to generate instructions for the smart device and send them to the smart device.

These instructions may configure the smart device(s) to cooperate with the computing device 900 and improve the picture quality on the display 906 in night mode. For example, the smart device may be a smart light fixture in the room where the computing device 900 is located. The central processor 902, operating in night mode, may be configured to identify that the smart light fixture is in the same room. While applying the night mode filters 936 (or the filters 136, 138 of FIG. 1), the central processor 902 may generate a set of operational values for the smart light fixture and send them, via the network communication interface 944, to the smart light fixture. The operational values may program the smart light fixture to emit light having properties (e.g., light intensity, direction, color values, diffusion, etc.) that, together with the night mode filter 936, improve readability of the display panel 908.

Figure 10:
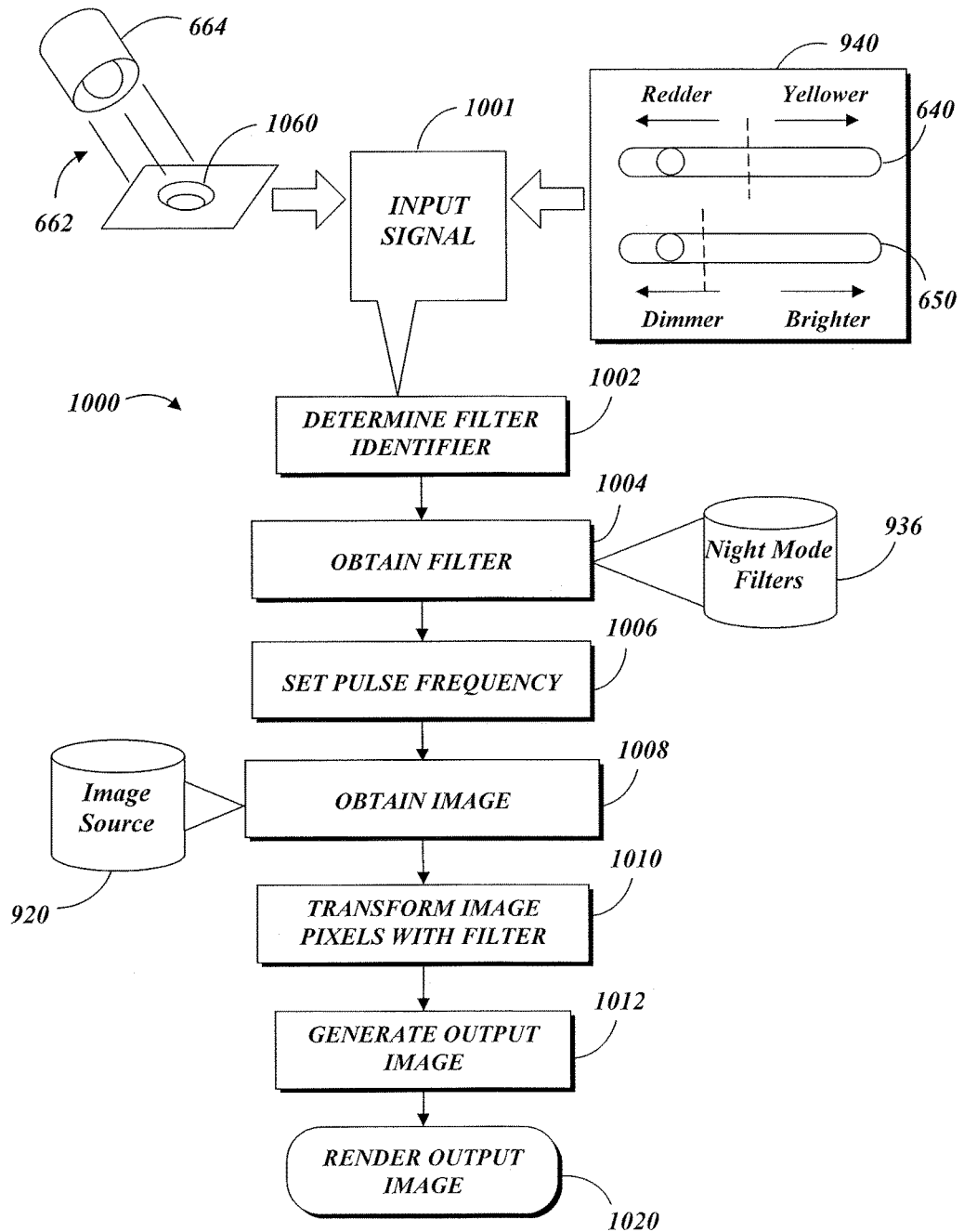
FIG. 10 is a flowchart illustrating another exemplary method of implementing night mode on a computing device, according to various embodiments.

FIG. 10 illustrates a method 1000 of operating the device 900 of FIG. 9 in night mode. The operation is similar to that of the method 600 of FIG. 6. The central processor 902 may receive an input signal 1001 that contains one or more filter identifiers. The input signal 1001 may be automatically generated according to computing device 900 settings (e.g., a trigger that activates night mode when an internal clock reaches a certain time of day), generated by the user input device 940 (e.g., from a user interface such as the sliders 640, 650 of FIG. 6), and/or generated by an ambient light sensor 1060 or another light sensor 942 when ambient light 662 from the light source 664 is incident on the ambient light sensor 1060. In step 1002, the central processor 902 may determine the filter identifiers in the input signal, as described with respect to step 602. In step 1004, the central processor 902 may obtain the night mode filter 936 associated with the filter identifier(s), as described above with respect to step 604. In step 1006, the central processor 902 may set the pulse frequency according to the dimming value of the night mode filter 936, as described above with respect to step 606. In step 1008, the central processor 902 may obtain the image from the image source 920, as described above with respect to step 608. In step 1010, the central processor 902 may transform the pixels of the image with the night mode filter 936, as described above with respect to step 610 and steps 804 and 806 of FIG. 8. In step 1012, the central processor 902 may generate an output image from the filtered pixels, as described above with respect to step 612, and at step 1020, the central processor 902 may render the output image to the display 906 as described above with respect to step 620.

Figure 11:
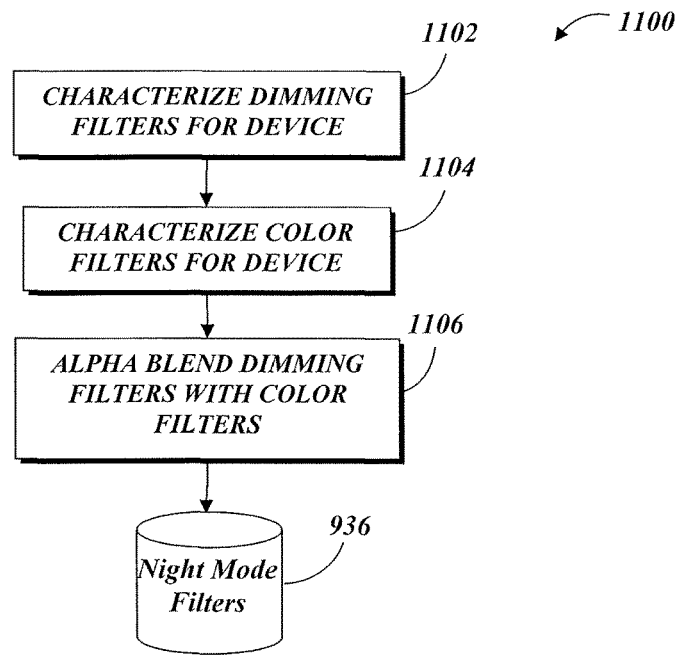
FIG. 11 is a flowchart illustrating an exemplary method of generating a night mode filter for use in night mode of a computing device, according to various embodiments.

FIG. 11 illustrates another exemplary method 1100 for obtaining the night mode filters 936 in advance of using the filters in a night mode of the computing device 900. At step 1102, the central processor 902 may characterize the dimming filters for the computing device 900, such as by performing the method 200 of FIG. 2. At step 1104, the central processor 902 may characterize the color filters for the computing device 900, such as by performing the method 300 of FIG. 3. At step 1106, the central processor 902 may combine each dimming filter and color filter associated with the same filter identifier, as described above with respect to step 802, to produce the corresponding night mode filter 936. Alternatively, at steps 1102 and 1104 the central processor 902 may characterize one dimming filter and one color filter, respectively, for a particular filter identifier (e.g., a screen brightness value), combine the dimming and color filters (step 1106) and store the resulting night mode filter, and then repeat steps 1102-1106 for each filter identifier.

Figure 12:
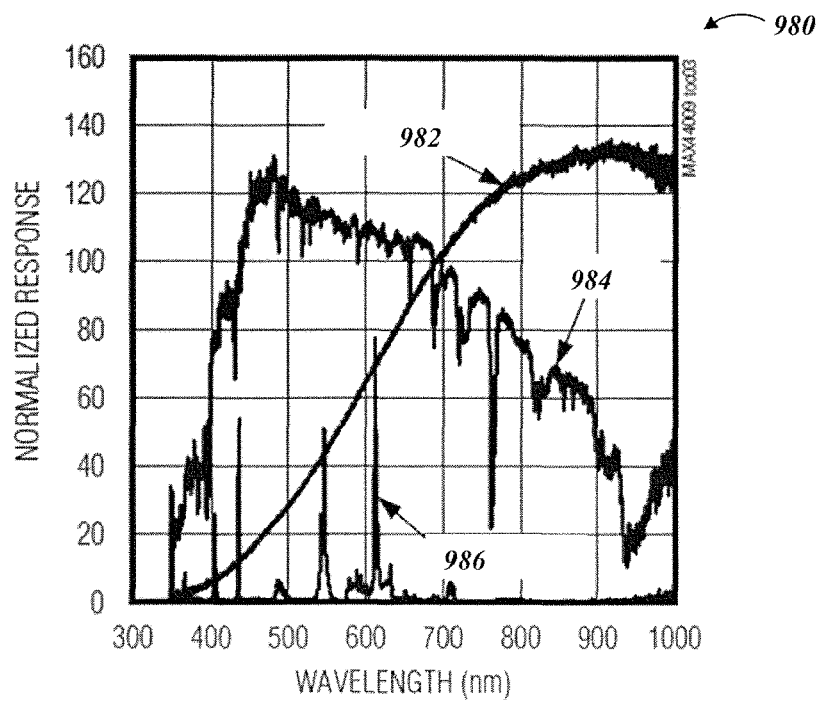
FIG. 12 is a graph illustrating wavelength response curves of various types of light.

In some embodiments, the computing device 900 may optimize the display 906 for readability and picture quality in various types of light. As demonstrated in FIG. 12, different types of light sources generate light having different wavelength response curves describing the luminance of a range of wavelengths of light. The graph 980 includes an incandescent curve 982 illustrating the wavelength response of an incandescent light bulb, a sunlight curve 984 illustrating the wavelength response of sunlight, and a fluorescent curve 986 illustrating the wavelength response of a particular type of fluorescent lamp. A plurality of light types 938 may be stored in memory 932 as records in a database or lookup table. Each light type 938 may include a wavelength response curve that identifies the type of light or light source, and normalizing values selected to modify the display parameters so that the viewing screen is optimized for viewing in the type of light. The wavelength response curve may comprise a plurality of response values and/or a function that represent(s) the expected luminance of various wavelengths of light generated by the light source. In one embodiment, the response values comprise one or more RGB tuples containing red, green, and blue color information of the light type. The normalizing values may include, for example, values for a red scalar, a green scalar, a blue scalar, and an opacity scalar to adjust the color temperature of the light emitted by the display panel 908, and a dimming scalar to adjust the pulse frequency/pulse width and accordingly raise or lower the backlight level.

Figure 13:
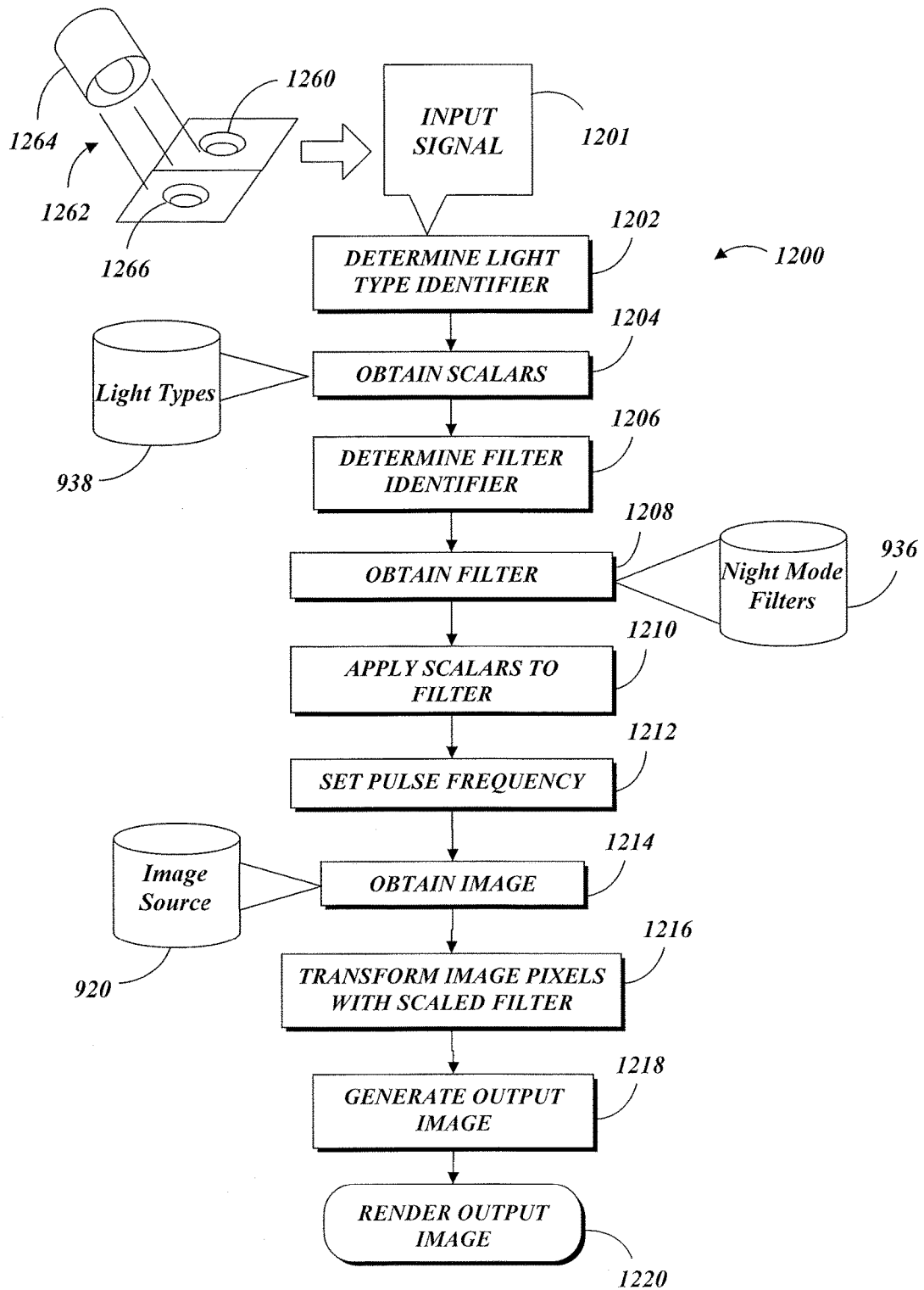
FIG. 13 is a flowchart illustrating an exemplary method of implementing night mode on a computing device with a light-to-digital converter, according to various embodiments.

FIG. 13 illustrates an exemplary method 1200 for operating the device 900 in night mode using an input signal 1201 from light sensors 942 including an ambient light sensor (ALS) 1260 and a DLC 1266. The ALS 1260 and the DLC 1266 may detect incident direct and/or ambient light 1262 generated by a light source 1264 and generate respective light data. One or both of the sensors 1260, 1266 may include the generated light data in the input signal 1201. In step 1202, the central processor 902 may determine a light type 938 of the incident light by extracting incident light color data of the incident light detected by the DLC 1266. The incident light color data may comprise an incident red light value, an incident green light value, and an incident blue light value representing color saturation of the incident light detected. The central processor 902 may match the incident light color data to the wavelength response values of one of the light types 938 to identify the type of the light source 1264. In step 1204, the central processor 902 may obtain the normalizing values (i.e., the scalars) associated with the identified light type.

In step 1206, the central processor 902 may determine the filter identifiers in the input signal 1201 (which may further include automatically or user-input generated filter identifiers), as described with respect to steps 602 and/or 1002. In step 1208, the central processor 902 may obtain the night mode filter 936 associated with the filter identifier(s), as described above with respect to steps 604 and 1004. In step 1210, the central processor 902 may apply the normalizing values to the corresponding values of the night mode filter 936 to produce source-optimized filter values scaled to account for the incident light. In one embodiment, each filter value is updated by simply multiply it with the corresponding scalar (e.g., the values of the combined RGB filter tuple with the red, green, and blue scalars, the combined alpha filter value with the opacity scalar, etc.). In step 1212, the central processor 902 may set the pulse frequency according to the dimming value of the night mode filter 936 (which may be source-optimized if the normalizing values include a dimming scalar) as described above with respect to steps 606 and 1006. In step 1214, the central processor 902 may obtain the image from the image source 920, as described above with respect to steps 608 and 1008. In step 1216, the central processor 902 may transform the pixels of the image with the night mode filter 936 comprising the source-optimized values, as described above with respect to step 1010. In step 1218, the central processor 902 may generate an output image from the filtered pixels, as described above with respect to step 1012, and at step 1220, the central processor 902 may render the output image to the display 906 as described above with respect to step 1020.

Figure 14:
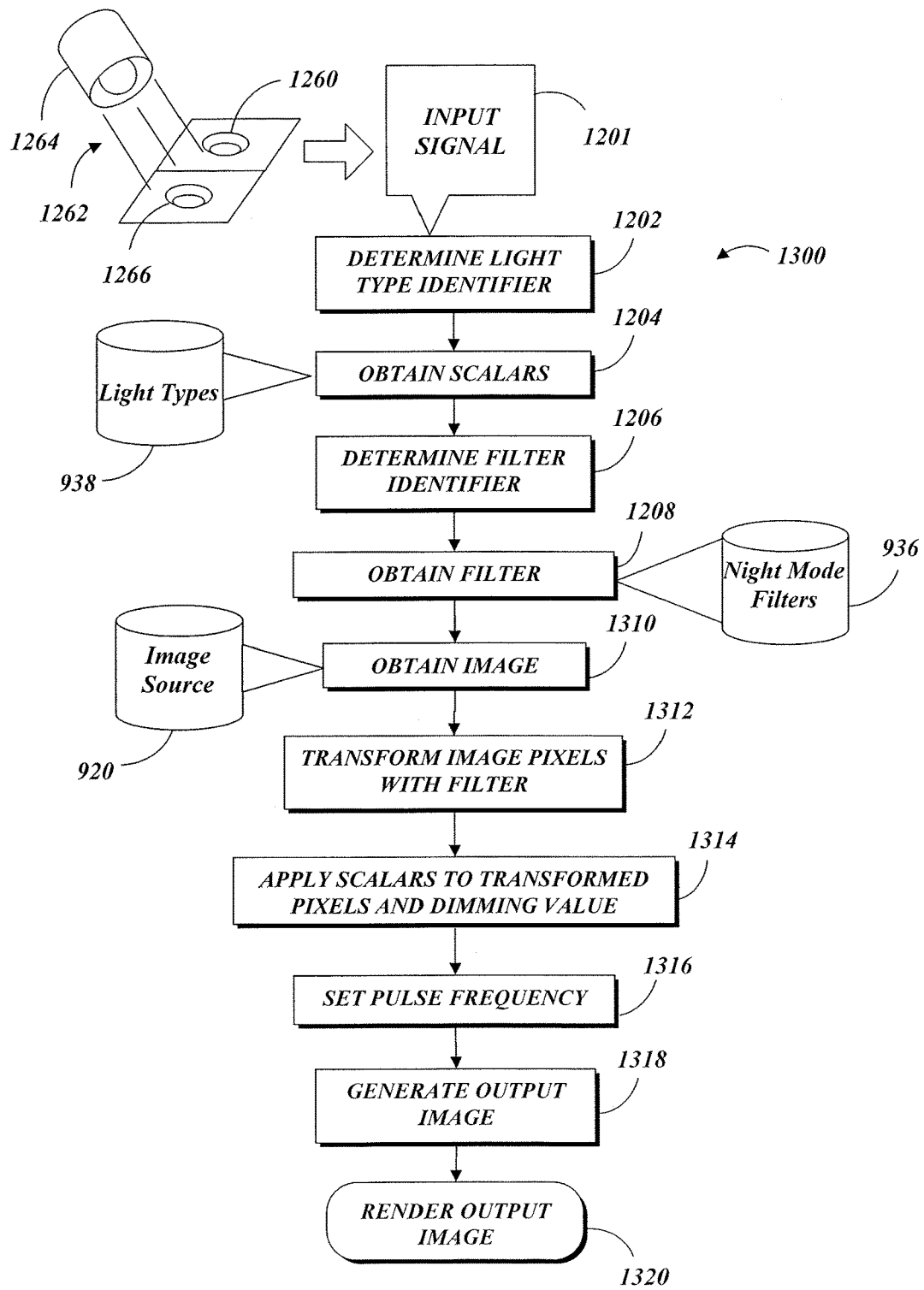
FIG. 14 is a flowchart illustrating another exemplary method of implementing night mode on a computing device with a light-to-digital converter, according to various embodiments.

A modification to the method 1200 is illustrated by the method 1300 of FIG. 14. The method 1300 beings with the receipt by the central processor 902 of the input signal 1201 generated at least in part by the light sensors 1260, 1266. The central processor 902 may perform the steps 1202-1208 as described with respect to the method 1200; at this point, the normalizing values for the identified light type, and the appropriate night mode filter 936, have been obtained. In step 1310, the central processor 902 may obtain the image from the image source 920, as described above with respect to step 1214. In step 1312, the central processor 902 may transform the pixels of the image with the night mode filter 936, as described above with respect to step 610 and steps 804 and 806 of FIG. 8. Then, in step 1314, the central processor 902 may apply the normalizing values to the corresponding values of the transformed pixels to produce output pixels having colors that are optimized to account for the incident light. In one embodiment, the central processor 902 may simply multiply the RGB values of a transformed pixel with the red, green, and blue scalars to produce the RGB values of the corresponding output pixel. In step 1314, the central processor 902 may further scale the dimming value of the night mode filter 936 with the dimming scalar, if any. In step 1316, the central processor 902 may set the pulse frequency according to the dimming value (which may be source-optimized) as described above with respect to step 606. In step 1318, the central processor 902 may generate an output image from the output pixels, as described above with respect to step 1218, and at step 1320, the central processor 902 may render the output image to the display 906 as described above with respect to step 1220.

Figure 15:
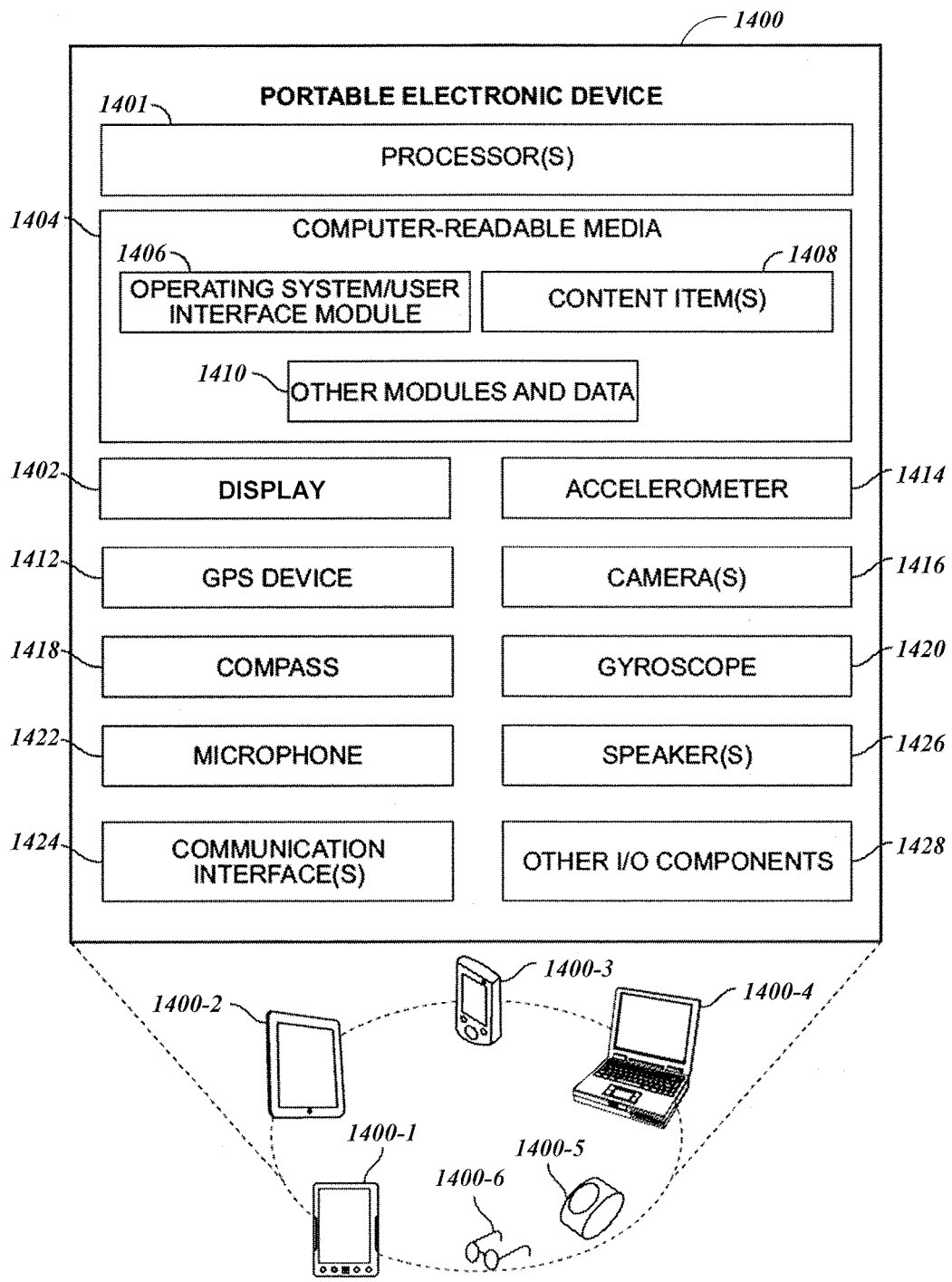
FIG. 15 is a system diagram illustrating select components of an example computing device that may implement night mode, as described in various embodiments.

FIG. 15 illustrates select example components of an example computing device 1400 (which may correspond to computing devices 100 and/or 900 described above) that may be used with a display 1402 that can be optimized for viewing conditions using the night mode described herein. Such types of displays 1402 include, but are not limited to, LCDs, cholesteric displays, electrophoretic displays, electrofluidic pixel displays, photonic ink displays, and the like.

The computing device 1400 may be implemented as any of a number of different types of electronic devices. Some examples of the computing device 1400 may include digital media devices and eBook readers 1400-1; tablet computing devices 1400-2; smart phones, mobile devices and portable gaming systems 1400-3; laptop and netbook computing devices 1400-4; wearable computing devices 1400-5; augmented reality devices, helmets, goggles or glasses 1400-6; and any other device capable of incorporating or connecting to the display 1402 and including a processor and memory for controlling the display 1402 according to the techniques described herein.

In a very basic configuration, the computing device 1400 includes, or accesses, components such as at least one control logic circuit, central processing unit, or processor 1401 (e.g., any central processor 102, 902 or graphics processor 104, 904 or a similar processor), and one or more computer-readable media 1404. Each processor 1401 may itself comprise one or more processors or processing cores. For example, the processor 1401 can be implemented as one or more microprocessors, microcomputers, microcontrollers, digital signal processors, central processing units, state machines, logic circuitries, and/or any devices that manipulate signals based on operational instructions. In some cases, the processor 1401 may be one or more hardware processors and/or logic circuits of any suitable type specifically programmed or configured to execute the algorithms and processes described herein. The processor 1401 can be configured to fetch and execute computer-readable instructions stored in the computer-readable media 1404 or other computer-readable media. The processor 1401 can perform one or more of the functions attributed to other processing components of the computing device 1400 (e.g., the central processor 102, 902, the graphics processor 104, 904, the power management processor 130, or the timing control interface 112, 912, column driver 914, or row driver 916 of the display 106, 906).

Depending on the configuration of the computing device 1400, the computer-readable media 1404 may be an example of tangible non-transitory computer storage media and may include volatile and nonvolatile memory and/or removable and non-removable media implemented in any type of technology for storage of information such as computer-readable instructions, data structures, program modules or other data. The computer-readable media 1404 may include, but is not limited to, RAM, ROM, EEPROM, flash memory or other computer readable media technology, CD-ROM, digital versatile disks (DVD) or other optical storage, magnetic cassettes, magnetic tape, solid-state storage and/or magnetic disk storage. Further, in some cases, the computing device 1400 may access external storage, such as RAID storage systems, storage arrays, network attached storage, storage area networks, cloud storage, or any other medium that can be used to store information and that can be accessed by the processor 1402 directly or through another computing device or network. Accordingly, the computer-readable media 1404 may be computer storage media able to store instructions, modules or components that may be executed by the processor 1402.

The computer-readable media 1404 may be used to store and maintain any number of functional components that are executable by the processor 1402. In some implementations, these functional components comprise instructions or programs that are executable by the processor 1401 and that, when executed, implement operational logic for performing the actions attributed above to the computing device 1400. Functional components of the computing device 1400 stored in the computer-readable media 1404 may include the operating system and user interface module 1406 for controlling and managing various functions of the computing device 1400, and for generating one or more user interfaces presented to a viewer on the display 1402.

In addition, the computer-readable media 1404 may also store data, data structures and the like, that are used by the functional components. For example, data stored by the computer-readable media 1404 may include user information and, optionally, one or more content items 1408. Depending on the type of the computing device 1400, the computer-readable media 1404 may also optionally include other functional components and data, such as other modules and data 1410, which may include programs, drivers and so forth, and the data used by the functional components. Further, the computing device 1400 may include many other logical, programmatic and physical components, of which those described are merely examples that are related to the discussion herein. Further, while the figures illustrate the functional components and data of the computing device 1400 as being present on the computing device 1400 and executed by the processor 1401 on the computing device 1400, it is to be appreciated that these components and/or data may be distributed across different computing devices and locations in any manner.

FIG. 15 further illustrates examples of other components that may be included in the computing device 1400. Such examples include various types of sensors, which may include a GPS device 1412, an accelerometer 1414, one or more cameras 1416, a compass 1418, a gyroscope 1420, a microphone 1422, and so forth.

The computing device 1400 may further include one or more communication interfaces 1424, which may support both wired and wireless connection to various networks, such as cellular networks, radio, Wi-Fi networks, close-range wireless connections, near-field connections, infrared signals, local area networks, wide area networks, the Internet, and so forth. The communication interfaces 1424 may further allow a user to access storage on or through another device, such as a remote computing device, a network attached storage device, cloud storage, or the like.

The computing device 1400 may further be equipped with one or more speakers 1426 and various other input/output (I/O) components 1428. Such I/O components 1428 may include a touchscreen and various user controls (e.g., buttons, a joystick, a keyboard, a keypad, etc.), a haptic or tactile output device, connection ports, physical condition sensors, and so forth. For example, the operating system 1406 of the computing device 1400 may include suitable drivers configured to accept input from a keypad, keyboard, or other user controls and devices included as the I/O components 1428. Additionally, the computing device 1400 may include various other components that are not shown, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A method for adapting display properties of a liquid crystal display (LCD) of a computing device during a night time period, the method comprising:

receiving a screen brightness value representing a target brightness to be exhibited by the LCD during the night time period;

determining that the screen brightness value matches a first filter identifier for a first filter of a plurality of filters stored in a memory of the computing device, the first filter comprising:

a red filter value, a green filter value, and a blue filter value together representing a first color of the first filter; and an alpha filter value representing a first opacity of the first color;

determining that the screen brightness value matches a second filter identifier for a second filter of the plurality of filters, the second filter comprising:

a dimming value representing a target pulse frequency;

a color mask value representing the color black; and an alpha mask value representing a second opacity of the color black;

receiving pixel data representing an image to be displayed on the LCD, the pixel data comprising a plurality of first pixels, wherein the image comprises a plurality of second pixels and receiving the pixel data comprises alpha blending the plurality of second pixels with a grey mask to produce the plurality of first pixels, the grey mask comprising the color mask value and the alpha mask value;

performing a blue suppression of the image by alpha blending the plurality of first pixels with the first filter to produce a plurality of output pixels;

generating an output image comprising the plurality of output pixels;

setting a pulse frequency of a pulsed voltage powering a light-emitting diode (LED) array to the target pulse frequency, such that the LED array illuminates the LCD at a backlight level; and displaying the output image via the LCD, wherein the LCD, displaying the output image at approximately the target brightness, emits a color luminance spectrum in which a first luminance of blue light is less luminous than a second luminance of a second color of light that is not blue.

2. The method of claim 1, wherein setting the pulse frequency to the target pulse frequency comprises setting the pulse frequency to a minimum frequency at which the LED array illuminates the LCD at a system-limited luminance represented by a system-limited brightness value; and wherein the screen brightness value is less than the system-limited brightness value, and the alpha mask value is selected so that the plurality of output pixels dim the LCD below the system-limited luminance.

3. The method of claim 1, wherein setting the pulse frequency to the target pulse frequency comprises setting the pulse frequency so that the LED array uses power at a first power consumption level of a plurality of potential power consumption levels, and wherein the LCD, displaying the output image at the backlight level, exhibits:
   a first contrast ratio of a plurality of contrast ratios producible by the LCD at the target brightness; and
   a first contrast-to-power ratio comparing the first contrast ratio to the first power consumption level, the first contrast-to-power ratio being greater than or equal to each potential contrast-to-power ratio of a plurality of potential contrast-to-power ratios, each potential contrast-to-power ratio of the plurality of potential contrast-to-power ratios comparing a corresponding contrast ratio of the plurality of contrast ratios to a corresponding potential power consumption level of the plurality of potential power consumption levels.

4. A computing device comprising:
   a display;
   an input device that receives an input and generates an input signal;
   memory storing program instructions; and
   a processor electrically coupled to the display, the input device, and the memory, the processor executing the program instructions to:
      determine that the input signal comprises a filter identifier of a first filter;
      determine a plurality of parameters of the first filter, the plurality of parameters including a brightness value representing a target brightness of the display, a red-green-blue (RGB) filter value representing saturation of a red filter or a yellow filter combined with a grey mask, wherein the grey mask is associated with the brightness value and comprises an RGB mask value representing black and an alpha mask value representing opacity of the grey mask, and an alpha filter value representing opacity of the first filter;
      receive an image comprising a plurality of pixels each having a corresponding RGB tuple representing color saturation of the pixel;
      transform, using the plurality of parameters, the image into an output image such that the display, when displaying the output image at the target brightness, emits blue light at a first luminance and emits a non-blue visible light at a second luminance, the second luminance being greater than the first luminance; and
      display the output image on the display.

5. The computing device of claim 4, wherein the filter identifier comprises a color temperature value representing a target color temperature of the display; and
   wherein the processor executes the program instructions to compute the RGB filter value and the alpha filter value from one or more of the brightness value and the color temperature value.

6. The computing device of claim 4, wherein the RGB filter value comprises a red filter value representing a saturation of red, a green filter value representing a saturation of green, and a blue filter value representing a saturation of blue and set so that the first filter has no saturation of blue.

7. The computing device of claim 4, further comprising an optical system electrically coupled to the processor, the optical system illuminating the display;
   the plurality of parameters of the first filter further including a dimming value associated with the brightness value;
   wherein the processor executes the program instructions to:
      determine a lighting level from the dimming value; and
      control the optical system to illuminate the display at the lighting level; and
   wherein the display, when displaying the output image at the target brightness, further exhibits a first contrast ratio of a plurality of contrast ratios producible by the display at the lighting level, the first contrast ratio being larger than each other contrast ratio of the plurality of contrast ratios.

8. The computing device of claim 4, further comprising an optical system electrically coupled to the processor, the optical system illuminating the display and having a minimum lighting level that causes the display to operate at a system-minimum brightness that is greater than the target brightness;
   wherein the alpha mask value is selected so that rendering the output image to the display dims the display below the system-minimum brightness to the target brightness.

9. The computing device of claim 4, further comprising an optical system electrically coupled to the processor, the optical system illuminating the display;
   the plurality of parameters of the first filter further including a dimming value associated with the brightness value;
   wherein the processor executes the program instructions to:
      determine a lighting level from the dimming value; and
      control the optical system to illuminate the display at the lighting level and to use power at a first power consumption level of a plurality of potential power consumption levels; and
   wherein the display, when displaying the output image at the target brightness, further exhibits:
      a first contrast ratio of a plurality of contrast ratios producible by the display at the target brightness; and
      a first contrast-to-power ratio comparing the first contrast ratio to the first power consumption level, the first contrast-to-power ratio being greater than or equal to each potential contrast-to-power ratio of a plurality of potential contrast-to-power ratios each comparing a corresponding contrast ratio of the plurality of contrast ratios to a corresponding potential power consumption level of the plurality of potential power consumption levels.

10. The computing device of claim 4, wherein:
   the input device is a light sensor that detects ambient light, generates detected light data representing the ambient light and generates the input signal including the detected light data; and
   to determine that the input signal comprises the filter identifier, the processor executes the program instructions to determine that the filter identifier is contained in the detected light data.

11. A computing device, comprising:
   a display;
   an input device that receives an input and generates an input signal;

memory storing program instructions; and
a processor electrically coupled to the display, the input device, and the memory, the processor executing the program instructions to:
  determine that the input signal comprises a filter identifier of a first filter;
  determine a plurality of parameters of the first filter, the plurality of parameters including a brightness value representing a target brightness of the display, a red-green-blue (RGB) filter value representing color saturation of the first filter, and an alpha filter value representing opacity of the first filter;
  determine that a second filter of the plurality of filters is associated with the filter identifier and with the brightness value, the second filter including a dimming value and a grey mask, the grey mask comprising:
    an RGB mask value representing the color black; and
    an alpha mask value representing opacity of the grey mask;
  receive an image comprising a plurality of pixels each having a corresponding RGB tuple representing color saturation of the pixel;
  transform, using the plurality of parameters, the image into an output image such that the display, when displaying the output image at the target brightness, emits blue light at a first luminance and emits a non-blue visible light at a second luminance, the second luminance being greater than the first luminance, wherein to transform the image, the computing device executes the program instructions to:
    perform a first alpha blending of the image with the first filter to produce an intermediate image;
    perform a second alpha blending of the intermediate image with the second filter to produce the output image in which each color of a plurality of colors of the output image is at least partially dimmed from a corresponding color of the image; and
  display the output image on the display.

12. A method, comprising:
receiving an input signal comprising a filter identifier associated with a night time period and identifying a first filter;
receiving an image to be displayed on a display;
receiving a plurality of parameters of the first filter, the plurality of parameters including a brightness value representing a target brightness of the display, a red-green-blue (RGB) filter value representing saturation of a red filter or a yellow filter combined with a grey mask, wherein the grey mask is associated with the brightness value and comprises an RGB mask value representing black and an alpha mask value representing opacity of the grey mask, and an alpha filter value;
applying the RGB filter value with an opacity represented by the alpha filter value to the image to produce an output image that, when displayed by the display, modifies light emitted by the display to exhibit a first light property of a plurality of light properties associated with the night time period; and
rendering the output image to the display.

13. The method of claim 12, wherein applying the RGB filter value to the image comprises performing an alpha blending of the RGB filter value with a RGB value of a pixel of the image according to the alpha filter value to produce a filtered pixel of the output image, the filtered pixel having a filtered RGB value,
the RGB filter value and the alpha filter value being set so that the first light property is a visible light spectrum in which blue light has a first luminance and a non-blue visible light has a second luminance that is greater than the first luminance.

14. The method of claim 12, wherein applying the RGB filter value to the image comprises performing an alpha blending of the RGB filter value with a RGB value of a pixel of the image according to the alpha filter value to produce a dimmed RGB value of a filtered pixel of the output image, the RGB filter value having zero saturation.

15. The method of claim 14, further comprising controlling a power controller of the display to display the output image at the target brightness, wherein when the target brightness is less than a minimum system brightness of the power controller, the first filter is configured to produce the plurality of filtered pixels so that the display displays the output image at the target brightness.

* * * * *